US008036092B2

(12) United States Patent
Katayama

(10) Patent No.: US 8,036,092 B2
(45) Date of Patent: Oct. 11, 2011

(54) OPTICAL HEAD DEVICE FOR DETECTING AN ERROR SIGNAL AND AN OPTICAL INFORMATION RECORDING/REPRODUCING DEVICE

(75) Inventor: Ryuichi Katayama, Tokyo (JP)

(73) Assignee: NEC Corporation, Tokyo (JP)

( * ) Notice: Subject to any disclaimer, the term of this patent is extended or adjusted under 35 U.S.C. 154(b) by 856 days.

(21) Appl. No.: 11/989,758

(22) PCT Filed: Jul. 31, 2006

(86) PCT No.: PCT/JP2006/315110
§ 371 (c)(1),
(2), (4) Date: Jan. 31, 2008

(87) PCT Pub. No.: WO2007/020787
PCT Pub. Date: Feb. 22, 2007

(65) Prior Publication Data
US 2010/0226234 A1 Sep. 9, 2010

(30) Foreign Application Priority Data

Aug. 18, 2005 (JP) ................. 2005-237949

(51) Int. Cl.
G11B 7/135 (2006.01)
G11B 7/00 (2006.01)
(52) U.S. Cl. .............. 369/112.07; 369/44.41; 369/47.45
(58) Field of Classification Search .... 369/44.37–44.42, 369/47.36–47.37, 47.45, 53.2–53.23, 53.25–53.28, 369/94, 112.03–112.15
See application file for complete search history.

(56) References Cited

U.S. PATENT DOCUMENTS

| 5,881,035 A | 3/1999 | Ueyama |
| 5,953,295 A * | 9/1999 | Nagano ...................... 369/44.23 |
| 6,407,973 B1 | 6/2002 | Ophey |
| 6,563,099 B2 | 5/2003 | Kimura et al. |

(Continued)

FOREIGN PATENT DOCUMENTS

JP 11-232665 8/1999

(Continued)

Primary Examiner — Nathan A Danielsen
(74) Attorney, Agent, or Firm — Foley & Lardner LLP

(57) ABSTRACT

To provide an optical head device, which can detect an excellent focus error signal for a dual layer optical recording medium, and optical information recording/reproducing device. Reflected light from a dual layer optical recording medium is diffracted by a diffractive optical element divided into four regions, and is received by a photodetector. Optical spots are equivalent to negative first order diffracted light from the four regions of the diffractive optical element, and are received by four dual-divided light receiving sections, respectively, to be used for detection a focus error signal by a Foucault's method. The four dual-divided light receiving sections are provided with positive component light receiving sections for outputting the received light as a positive component of the focus error signal and negative component light receiving sections for outputting the received light as a negative component of the focus error signal, respectively. When a signal layer of the optical recording medium is far from an objective lens by a defocusing quantity equivalent to an interval between the first layer and the second layer from a just focus position, a diffraction direction of a diffracted light generated from the reflected light from the signal layer is set so as that the diffracted light spreads to the positive component light receiving section and the negative component light receiving section, and a plurality of the positive component light receiving sections and a plurality of negative component light receiving sections are arranged.

4 Claims, 20 Drawing Sheets

| U.S. PATENT DOCUMENTS | | | | | FOREIGN PATENT DOCUMENTS | | |
|---|---|---|---|---|---|---|---|
| 6,707,773 | B2* | 3/2004 | Katayama | 369/53.19 | JP | 2001-236661 A | 8/2001 |
| 6,894,958 | B2 | 5/2005 | Katayama | | JP | 2002-183987 A | 6/2002 |
| 2002/0070328 | A1 | 6/2002 | Kimura et al. | | JP | 2002-525781 A | 8/2002 |
| 2003/0058759 | A1* | 3/2003 | Katayama | 369/44.41 | JP | 2004-139728 A | 5/2004 |
| 2005/0135207 | A1 | 6/2005 | Katayama | | | | |

* cited by examiner

9a PHOTODETECTOR

9a PHOTODETECTOR

9a PHOTODETECTOR

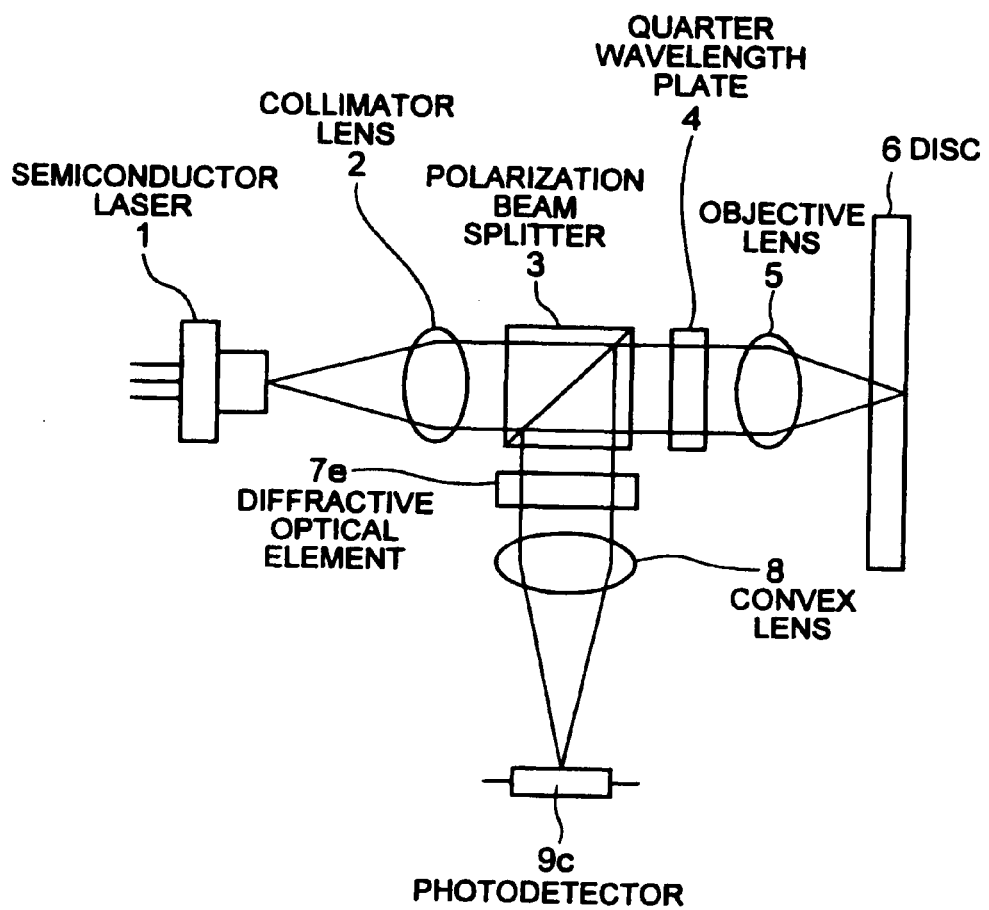

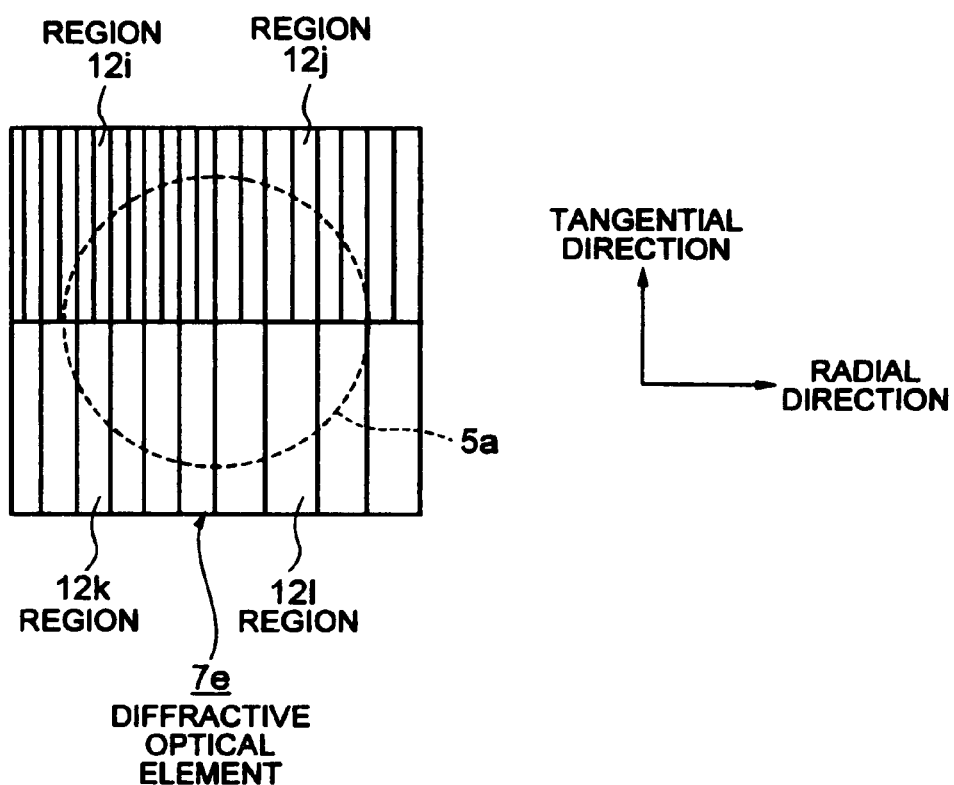
PRIOR ART FIG. 17

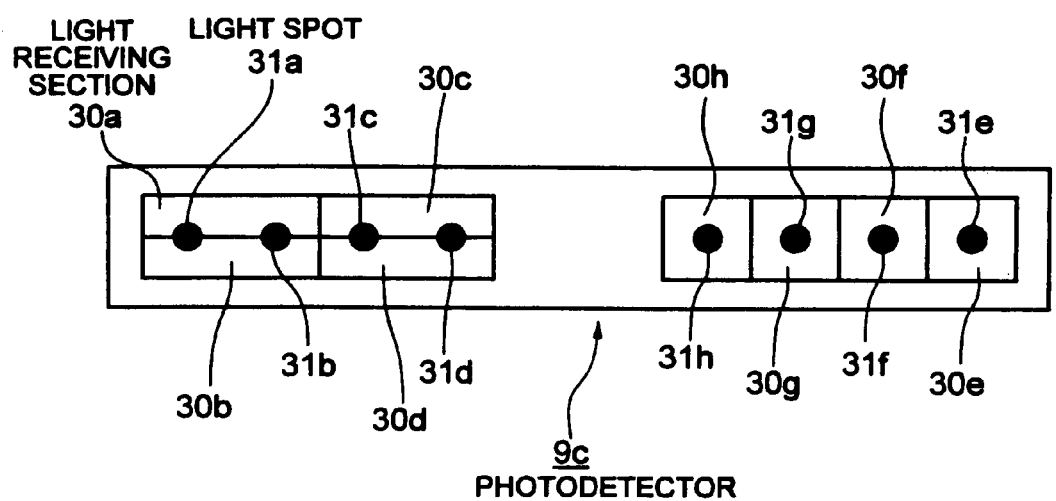
PRIOR ART FIG. 18

PRIOR ART  FIG. 19
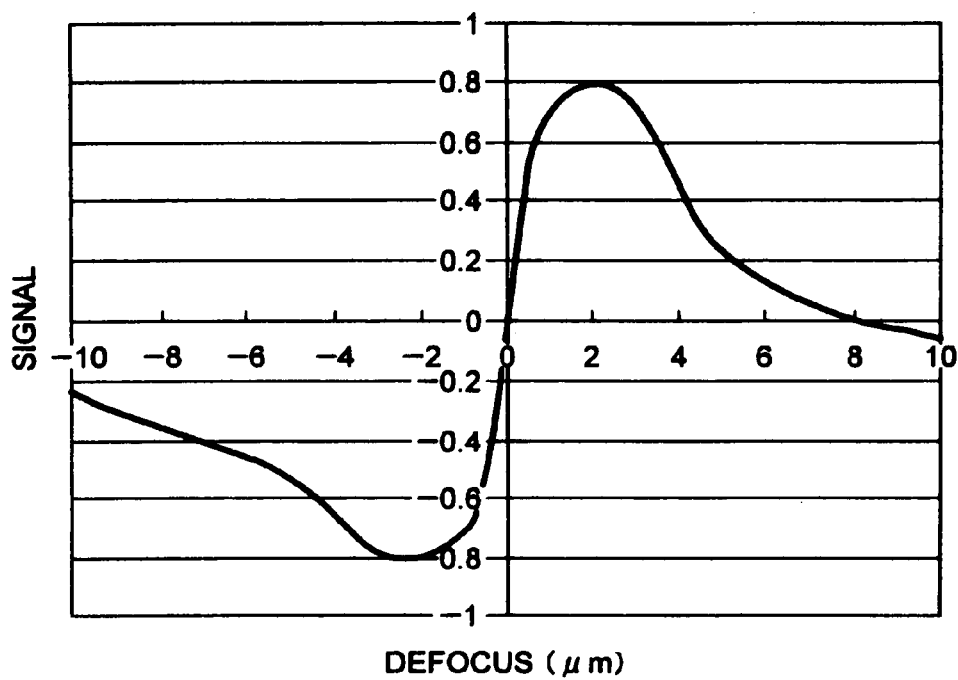

US 8,036,092 B2

OPTICAL HEAD DEVICE FOR DETECTING AN ERROR SIGNAL AND AN OPTICAL INFORMATION RECORDING/REPRODUCING DEVICE

This application is the National Phase of PCT/JP2006/315110, filed Jul. 31, 2006, which claims priority to Japanese Application No. 2005-237949, filed Aug. 18, 2005, the disclosures of which are hereby incorporated by reference in their entirety.

TECHNICAL FIELD

The present invention relates to an optical head device and an optical information recording/reproducing device for performing at least either recording or reproducing for optical recording medium, in particular, to an optical head device and an optical information recording/reproducing device capable of detecting an excellent focus error signal for a dual layer optical recording medium.

BACKGROUND ART

The optical head device and the optical information recording/reproducing device for performing at least either recording or reproducing on the optical recording medium include a function of detecting a focus error signal and a track error signal. The Foucault's method (or a double knife-edge method), an astigmatic method, a spot size method, and the like are known as a method of detecting the focus error signal. Optical recording media in a write-once type and a rewritable type include a groove formed thereon for tracking. When a light focusing spot formed on an optical recording medium by an optical head device transects the groove, noise is generated in a focus error signal.

The noise above is smaller in the Foucault's method than the astigmatic method and the spot size method. This character becomes remarkable in the rewritable optical recording media (DVD-RAM, HD DVD-RW, etc.) with a land/groove recording/reproducing system in which recording or reproducing are performed for a LAND of a concave region in the groove and a GROOVE of a convex region in the groove. Accordingly, the Foucault's method is generally used to detect a focus error signal for those optical recording media.

On the other hand, in order to detect a track error signal, a phase-contrast method is generally used for optical recording media of a playback-only type (DVD-ROM, HD DVD-ROM, etc.), and a push-pull method is used for the write-once type (DVD-R, HD DVD-R, etc.) and the rewritable type (DVD-RAM, HD DVD-RW, etc.).

Therefore, in order to be applicable for all types of the optical recording media, such as the playback-only type, the write-once type and the rewritable type, an optical head device and an optical information recording/reproducing device are required to include a function of detecting a focus error signal by the Foucault's method, and detecting a track error signal by the phase-contrast method and the push-pull method. In order to downsize the optical head device, reflected light from an optical recording medium need to be received by a same photodetector to detect those signals. Patent Document 1 discloses an optical head device which receives reflected light from an optical information medium at the same photodetector in order to detect a focus error signal by the Foucault's method and a track error signal by the phase-contrast method and the push-pull method.

FIG. 16 shows the optical head device recited in Patent Document 1. Emitting light from a semiconductor laser 1 is parallelized by a collimator lens 2, and the light injects into a polarization beam splitter 3 as P polarization to be transmitted by almost 100%, and then it is transmitted through a quarter wavelength plate 4 to be converted from linear polarization into circular polarization, and the light is collected on a disc 6 by a objective lens 5. Reflected light from the disc 6 is transmitted through the objective lens 5 inversely, and is transmitted through the quarter wavelength plate 4 to be converted from the circular polarization into linear polarization having an orthogonal direction to the linear polarization of an incoming way, and injects into the polarization beam splitter 3 as S polarization to be reflected by almost 100%, and then is diffracted by a diffractive optical element 7e, and is transmitted through a convex lens 8, and is received by a photodetector 9c.

FIG. 17 shows a plan view of the diffractive optical element 7e. The diffractive optical element 7e has a diffraction grating formed therein which is divided into four, regions 12i-12l, by a line passing through an optical axis of an incident light and parallel to a radical direction of the disc 6, and a line passing through the optical axis of the incident light and parallel to a tangential direction of the disc 6. Each direction of the diffraction grating is parallel to the tangential direction of the disc 6, and each pattern in the diffraction grating is linear at a regular pitch. The pitch of the diffraction grating narrows from the regions 12i, 12j, 12k, 12l in order. In this regard, a circle 5a illustrated with dotted lines in the drawing corresponds to an effective diameter of the objective lens 5. A light beam injects into the regions 12i, 12j, 12k, 12l is diffracted by about 10% to be negative first order diffracted light, and is also diffracted by about 71% to be positive first order diffracted light.

FIG. 18 shows a pattern with light receiving sections in the photodetector 9c and an arrangement of optical spots on the photodetector 9c. Optical spots 31a and 31b correspond to negative first order diffracted light from the regions 12i and 12j of the diffractive optical element 7e respectively, and are received by light receiving sections 30a and 30b into which a light receiving section is divided by a dividing line parallel to a radial direction of the disc 6. Optical spots 31c and 31d correspond to negative first order diffracted light from the regions 12k and 12l of the diffractive optical element 7e respectively, and are received by light receiving sections 30c and 30d into which a light receiving section is divided by a dividing line parallel to the radial direction of the disc 6. An optical spot 31e corresponds to positive first order diffracted light from the region 12i of the diffractive optical element 7e, and is received by a single light receiving section 30e. An optical spot 31f corresponds to positive first order diffracted light from the region 12j of the diffractive optical element 7e, and is received by a single light receiving section 30f. An optical spot 31g corresponds to positive first order diffracted light from the region 12k of the diffractive optical element 7e, and is received by a single light receiving section 30g. An optical spot 31h corresponds to positive first order diffracted light from the region 12l of the diffractive optical element 7e, and is received by a single light receiving section 30h.

Outputs from the light receiving sections 30a to 30h are represented by V30a to V30h respectively. Then, a focus error signal according to the Foucault's method can be obtained from calculation of (V30a+V30d)−(V30b+V30c). A track error signal according to the phase-contrast method can be obtained from a phase difference between (V30e+V30h) and (V30f+V30g). A track error signal according to the push-pull method can be obtained from calculation of (V30e+V30g)−(V30f+V30h). Further, an RF signal recorded on the disc 6 can be obtained from calculation of (V30e+V30f+V30g+

V30h). In the optical head device disclosed in patent document 1, the configurations of the photodetector and the computation circuit are simple since only four light receiving sections for detecting the focus error signal and four light receiving sections for detecting the track error signal are necessary.

Patent document 1: Japanese Laid-Open Patent Publication No. 2004-139728

BRIEF DESCRIPTION OF THE DRAWINGS

FIG. 16 A diagram showing a conventional optical head device;

FIG. 17 A plan view of a diffractive optical element in the conventional optical head device;

FIG. 18 A diagram showing a pattern with light receiving sections of a photodetector and an arrangement of optical spots on the photodetector in the conventional optical head device.

FIG. 19 A view showing a calculation example of a focus error signal detected using the conventional optical head device.

DISCLOSURE OF THE INVENTION

Figure 1:
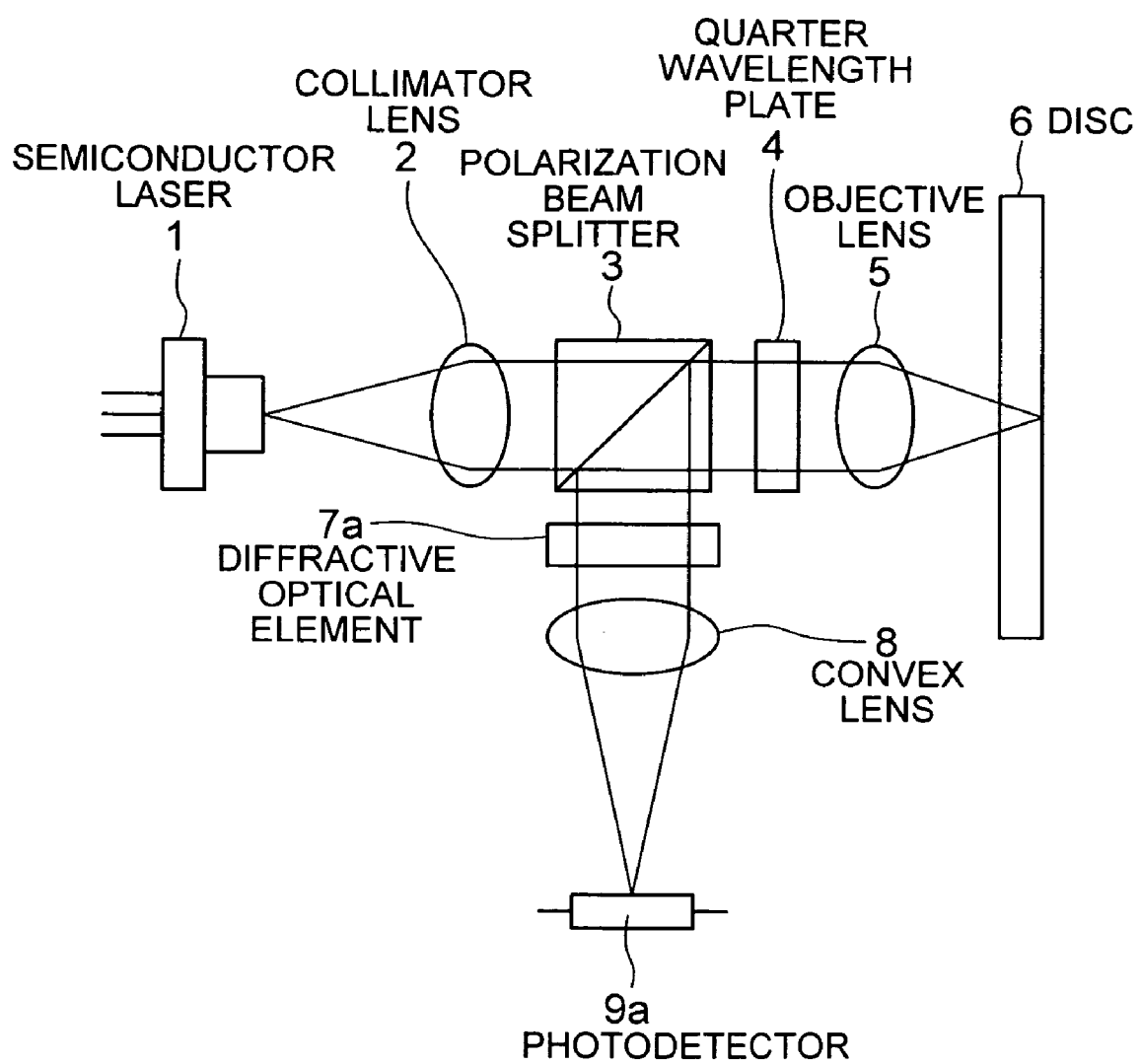
FIG. 1 A diagram showing a first exemplary embodiment of an optical head device according to the present invention.

Problems to be Solved by the Invention

FIG. 19 shows a calculation example of the focus error signal detected using the optical head device disclosed in patent document 1. The conditions used for the calculation are, the wavelength of the semiconductor laser 1 is 405 nm, the numerical aperture of the objective lens 5 is 0.65, the magnification of the detection optical system (ratio of focal length of the convex lens 8 and the focal length of the objective lens 5) is 10, and the size of the light receiving sections 30a to 30d of the photodetector 9c is 140 µm×35 µm. The wavelength of 405 nm and the numerical aperture of 0.65 are equivalent to the conditions of HD DVD. The horizontal axis of the drawing is the defocusing quantity of the disc 6 and defines a case where the disc 6 is far from the objective lens 5 as negative and a case where the disc 6 is close to the objective lens 5 as positive. The vertical axis of the drawing is the signal standardized at the level of the sum signal at the defocus of 0 µm.

The optical recording medium such as DVD-ROM, HD DVD-ROM, and the like has a dual layer standard. The focus error signal in the dual layer optical recording medium is obtained by shifting the focus error signal with respect to the first layer (layer close to the objective lens) and the focus error signal with respect to the second layer (layer far from the objective lens) in the horizontal direction in FIG. 19 by the defocusing quantity equivalent to the layer interval and adding the same. That is, even if the signal is obtained by focusing on one layer, the signal from the other layer is mixed in the relevant signal.

In this case, if the focus error signal in the single layer optical recording medium has DC component at the defocus position corresponding to the layer interval, offset caused by the DC component occurs at the just focus position in the focus error signal in the dual layer optical recording medium. According to the standard of HD DVD-ROM, the layer interval in the dual layer optical recording medium is 15 µm to 25 µm in the medium of the intermediate layer. The refraction index of the medium of the intermediate layer is 1.6, which corresponds to about 9.4 µm to about 15.6 µm in air. The focus error signal shown in FIG. 19 contains DC component of only about −0.05 at the defocus position near +9.4 µm, but contains DC component of about −0.3 at the defocus position near −9.4 µm. In this case, an offset of only about −0.05 (signal from the first layer on the inner side) occurs at the just focus position of the second layer, but an offset of about −0.3 (signal from the second layer on the outer side) occurs at the just focus position of the first layer in the focus error signal in the HD DVD-ROM of dual layer. Thus, focus servo cannot be properly applied on the first layer, and a high quality RF signal cannot be obtained.

Figure 20A:
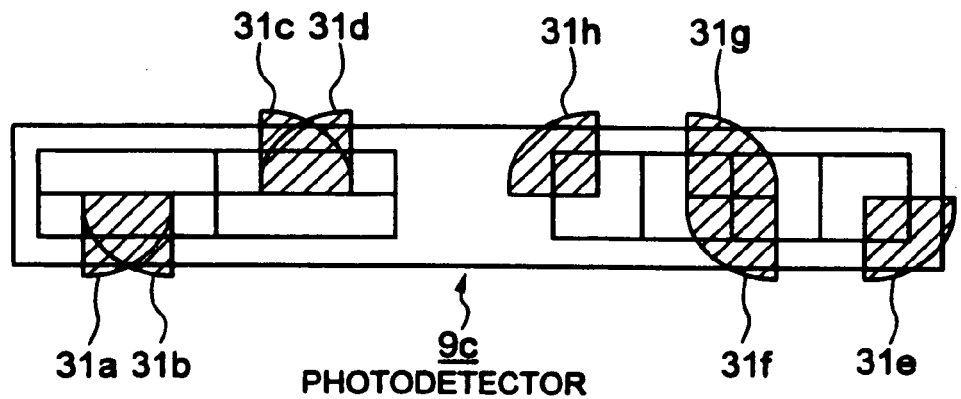
FIG. 20 A view showing change in the pattern of the light receiving sections of the photodetector and the arrangement of the optical spots on the photodetector of when a defocusing quantity of the disc is changed in the conventional optical head device.
Figure 20B:
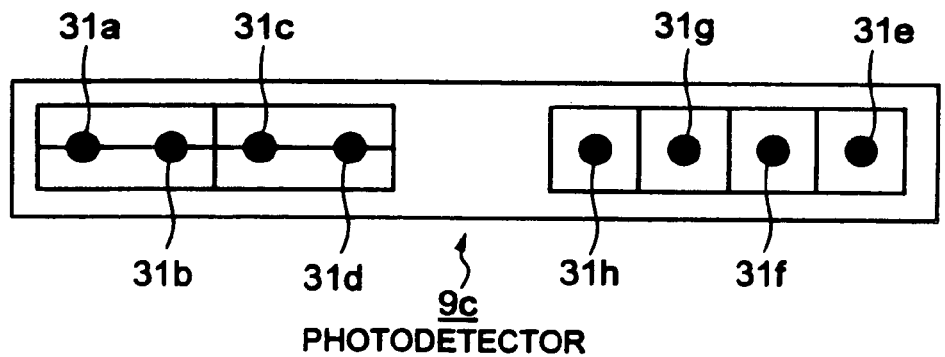
Figure 20C:
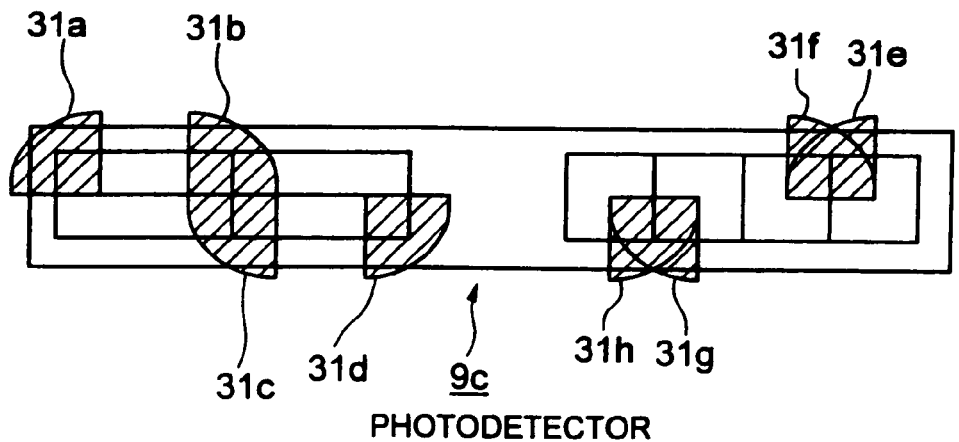

FIG. 20 shows change in the pattern of the light receiving sections of the photodetector 9c and the arrangement of the optical spots on the photodetector 9c when the defocusing quantity of the disc 6 is changed. In the drawing, (a) corresponds to a case where the disc 6 is far from the objective lens 5, (b) corresponds to a case where the disc 6 is at the just focus position, and (c) corresponds to a case where the disc 6 is close to the objective lens 5. The optical spots 31*a* to 31*h* have dot form when the disc 6 is at the just focus position, but have a quarter of a circle form when the disc 6 is far from the objective lens 5 or when close to the objective lens 5.

When the disc 6 is close to the objective lens 5, the optical spot 31*a* is mainly received by the light receiving section 30*a*, where most of the portions run over to the upper side and the left side of the light receiving section 30*a* and only one portion remains within the light receiving section 30*a* when the absolute value of the defocusing quantity becomes large. The optical spot 31*b* is mainly received by the light receiving section 30*a*, where most of the portions run over to the upper side of the light receiving section 30*a* and to the light receiving section 31*c* and only one portion remains within the light receiving section 30*a* when the absolute value of the defocusing quantity becomes large. The optical spot 31*c* is mainly received by the light receiving section 30*d*, where most of the portions run over to the lower side of the light receiving section 30*d* and to the light receiving section 30*b* and only one portion remains within the light receiving section 30*d* when the absolute value of the defocusing quantity becomes large. The optical spot 31*d* is mainly received by the light receiving section 30*d*, where most of the portions run over to the lower side and the right side of the light receiving section 30*d* and only one portion remains within the light receiving section 30*d* when the absolute value of the defocusing quantity becomes large. The light received by the light receiving sections 30*a*, 30*d* and the light received by the light receiving sections 30*b*, 30*c* contribute at opposite polarities to each other with respect to the focus error signal. This is because the focus error signal is obtained by (V30*a*+V30*d*)−(V30*b*+V30*c*), as described above. Therefore, if the defocusing quantity is positive, the focus error signal barely contains DC component when the absolute value of the defocusing quantity becomes large.

When the disc 6 is far from the objective lens 5, the optical spots 31*a*, 31*b* are mainly received by the light receiving section 30*b*, where one portion runs over to the lower side of the light receiving section 30*b* but most of the portions remain within the light receiving section 30*b* when the absolute value of the defocusing quantity becomes large. The optical spots 31*c*, 31*d* are mainly received by the light receiving section 30*c*, where one portion runs over to the upper side of the light receiving section 30*c* but most of the portions remain within the light receiving section 30*c* when the absolute value of the defocusing quantity becomes large. The light received by the light receiving sections 30*b*, 30*c* contributes at a negative polarity with respect to the focus error signal. Therefore, if the defocusing quantity is negative, the focus error signal contains negative DC component having a large absolute value even when the absolute value of the defocusing quantity becomes large.

So, an object of the present invention is to provide an optical head device and an optical information recording/reproducing device capable of detecting an excellent focus error signal for a dual layer optical recording medium solving the above problems in an optical head device and an optical information recording/reproducing device for receiving reflected light from an optical recording medium at a same photodetector to detect a focus error signal by the Foucault's method and a track error signal by the phase-contrast method and the push-pull method.

Means of Solving the Problem

An optical head device according to the present invention includes a light source, an objective lens for collecting emitting light from the light source on a disc shaped optical recording medium, a diffractive optical element, arranged on an optical path of a reflected light from the optical recording medium, for generating a diffracted light from the reflection light, and a photodetector for receiving the diffracted light generated at the diffractive optical element. The optical recording medium includes an optical recording medium with at least a signal layer of first layer and second layer. The photodetector includes a positive component light receiving section for receiving the diffracted light and outputting as a positive component of a focus error signal, and a negative component light receiving section for receiving the diffracted light and outputting as a negative component of the focus error signal. Consider a case where the signal layer of the optical recording medium is far from the objective lens or close to the objective lens by a defocusing quantity corresponding to an interval between the first layer and the second layer from a just focus position. In this case, the diffraction direction of the diffracted light is set so that the diffracted light generated from the reflected light of the signal layer spreads to the positive component light receiving section and the negative component light receiving section, and the plurality of positive component light receiving sections and the plurality of negative component light receiving sections are arranged.

The spots of the diffracted light spread wider than the spots at the just focus position with the positive or negative defocusing quantity corresponding to the interval of the first layer and the second layer of the optical recording medium. In this case, the spots spread with being biased to either the positive component light receiving section or the negative component light receiving section in the conventional optical head device, and thus noise of DC component is contained in the focus error signal from the first layer or the second layer. In the optical head device according to the present invention, on the other hand, the spots spread to both the positive component light receiving section and the negative component light receiving section, and thus the noise of DC component of the focus error signal cancel each other and decreases. In this case, the diffractive optical element is theoretically (by simulation etc.) and experimentally (by trial and error etc.) adjusted so that the diffracted light spreads to the positive component light receiving section and the negative component light receiving section, and the plurality of negative component light receiving sections and the plurality of positive component light receiving sections are arranged.

For instance, the diffractive optical element is divided into four diffracting regions in a plane vertical to an optical axis of the reflected light by a first line passing through the optical axis and corresponding to a radial direction of the optical recording medium and a second line passing through the optical axis and corresponding to a tangential direction of the optical recording medium. The four diffracting regions each generate the diffracted light of a specific order from the reflected light. The photodetector includes four dual-divided light receiving sections divided into two of the positive component light receiving section and the negative component light receiving section by a third line parallel to the first line, where when the two diffracting regions position on one side with the first line in between of the four diffracting regions are set as first and second diffracting regions, the two diffracting regions positioned on the other side are set as third and fourth diffracting regions, and the four dual-divided light receiving sections are set as first to fourth dual-divided light receiving sections, the four dual-divided light receiving sections are arranged in an order of the first dual-divided light receiving section, the third dual-divided light receiving section, the second dual-divided light receiving section, and the fourth dual-divided light receiving section along the third line.

In other words, the optical head device according to the present invention is an optical head device including a light source; an objective lens for collecting an exiting light from the light source on a disc shaped optical recording medium; a diffractive optical element arranged on an optical path of a reflected light from the optical recording medium; and a photodetector for receiving the diffracted light generated from the reflected light by the diffractive optical element, the diffractive optical element being divided into four regions in a plane vertical to an optical axis of the reflection light by a first line passing through the optical axis and corresponding to a radial direction of the optical recording medium and a second line passing through the optical axis and corresponding to a tangential direction of the optical recording medium, and the four regions each generating at least a diffracted light of a specific order from the reflected light, wherein the photodetector includes at least four dual-divided light receiving sections, each being divided in half with a third line parallel to the first line, for receiving the diffracted light of the specific order generated in each of the four regions to detect a focus error signal; and when the two regions position on one side with respect to the first line of the four regions are set as first and second regions, the two regions positioned on the other side are set as third and fourth regions, and the four dual-divided light receiving sections for receiving the diffracted light of the specific order generated in each of the first to the fourth regions are set as first to fourth dual-divided light receiving sections, the four dual-divided light receiving sections are arranged in an order of the first light receiving section, the third light receiving section, the second light receiving section, and the fourth light receiving section along the third line.

A linear diffraction grating is formed in the four regions, the direction of the grating being parallel to the second line and the pitch of the grating being even; and the pitch of the diffraction grating formed in each of the four regions preferably becomes wider or narrower in the order of the first region, the third region, the second region, and the fourth region.

Preferably, the diffractive optical element further generates a diffracted light of another order different from the specific order from the reflected light in each of the four regions; and the photodetector further includes four light receiving sections for receiving the diffracted light of the other order generated in each of the four regions to detect a track error signal and an RF signal.

An optical information recording/reproducing device according to the present invention includes at least the optical head device according to the present invention; and a circuit for generating the focus error signal based on the output signals from the four dual-divided light receiving sections for receiving the diffracted light of the specific order generated in each of the four regions.

In the optical head device and the optical information recording/reproducing device of the present invention, when the optical recording medium is far from the objective lens and when the optical recording medium is close to the objective lens each optical spot on the photodetector is mainly received by one light receiving section configuring the corresponding dual-divided light receiving section, where most of the portions run out to the outer side of one light receiving section configuring the corresponding dual-divided light receiving section or to one light receiving section configuring the adjacent dual-divided light receiving section and only one portion remains in the light receiving section configuring the corresponding dual-divided light receiving section when the absolute value of the defocusing quantity becomes large. The light received by one light receiving section configuring the dual-divided light receiving section and the light received by one light receiving section configuring the adjacent dual-divided light receiving section corresponding to each optical spot contribute in opposite polarities to each other with respect to the focus error signal. Therefore, the focus error signal barely contains DC component when the absolute value of the defocusing quantity becomes large for when the defocusing quantity is negative and for when the defocusing quantity is positive.

When the focus error signal in the single layer optical recording medium does not contain DC component at the defocus position corresponding to the layer interval in the dual layer optical recording medium, offset caused by such DC component does not occur at the just focus position in the focus error signal in the dual layer optical recording medium. Thus, the focus servo is properly applied to both the first layer and the second layer, and a high quality RF signal is obtained.

Advantageous Effect of the Invention

According to the optical head device and the optical information recording/reproducing device of the present invention, an excellent focus error signal can be detected with respect to the dual layer optical recording medium. This is because the focus error signal in the single layer optical recording medium does not contain DC component at the defocus position corresponding to the layer interval in the dual layer optical recording medium, and thus offset caused by such DC component does not occur at the just focus position in the focus error signal in the dual layer optical recording medium.

BEST MODE FOR CARRYING OUT THE INVENTION

The exemplary embodiments of the present invention will now be described with reference to the drawings.

FIG. 1 shows a first exemplary embodiment of an optical head device according to the present invention. Emitting light from a semiconductor laser 1 is parallelized by a collimator lens 2, and injects into a polarization beam splitter 3 as P polarization and is transmitted by almost 100%, and then is transmitted through a quarter wavelength plate 4 to be converted from linear polarization to circular polarization, and is collected on a disc 6 by an objective lens 5. Reflected light from the disc 6 is transmitted through the objective lens 5 inversely, and is transmitted through the quarter wavelength plate 4 to be converted from the circular polarization to linear polarization orthogonal to the polarization direction of the one in an incoming way, and then injects into the polarization beam splitter 3 as S polarization to be reflected by almost 100%, is diffracted by a diffractive optical element 7a, and is received by a photodetector 9a after transmitted through the convex lens 8.

Figure 2:
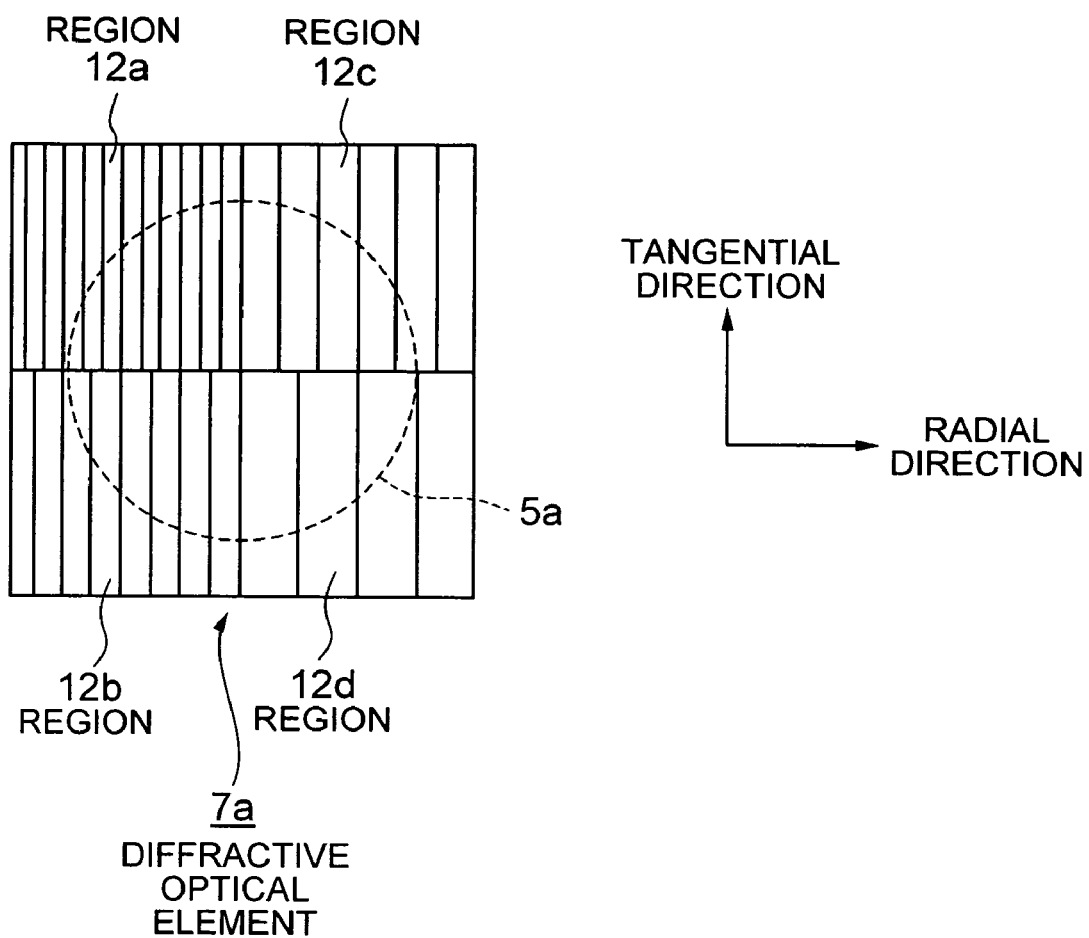
FIG. 2 A plan view of a diffractive optical element in the first exemplary embodiment of the optical head device according to the present invention.

FIG. 2 is a plan view of the diffractive optical element 7a. The diffractive optical element 7a has a configuration formed with a diffraction grating divided into four regions 12a to 12d by a line passing through the optical axis of the incident light and being parallel to the radial direction of the disc 6 and a line passing through the optical axis of the incident light and being parallel to the tangential direction of the disc 6. The directions of the diffraction grating are both parallel to the tangential direction of the disc 6, and the patterns of the diffraction grating are all linear with a regular pitch. The pitch of the diffraction grating becomes wider in the order of region 12a, 12b, 12c, 12d. In this regard, a circle 5a illustrated with dotted lines in the drawing corresponds to an effective diameter of the objective lens 5.

Figure 3:
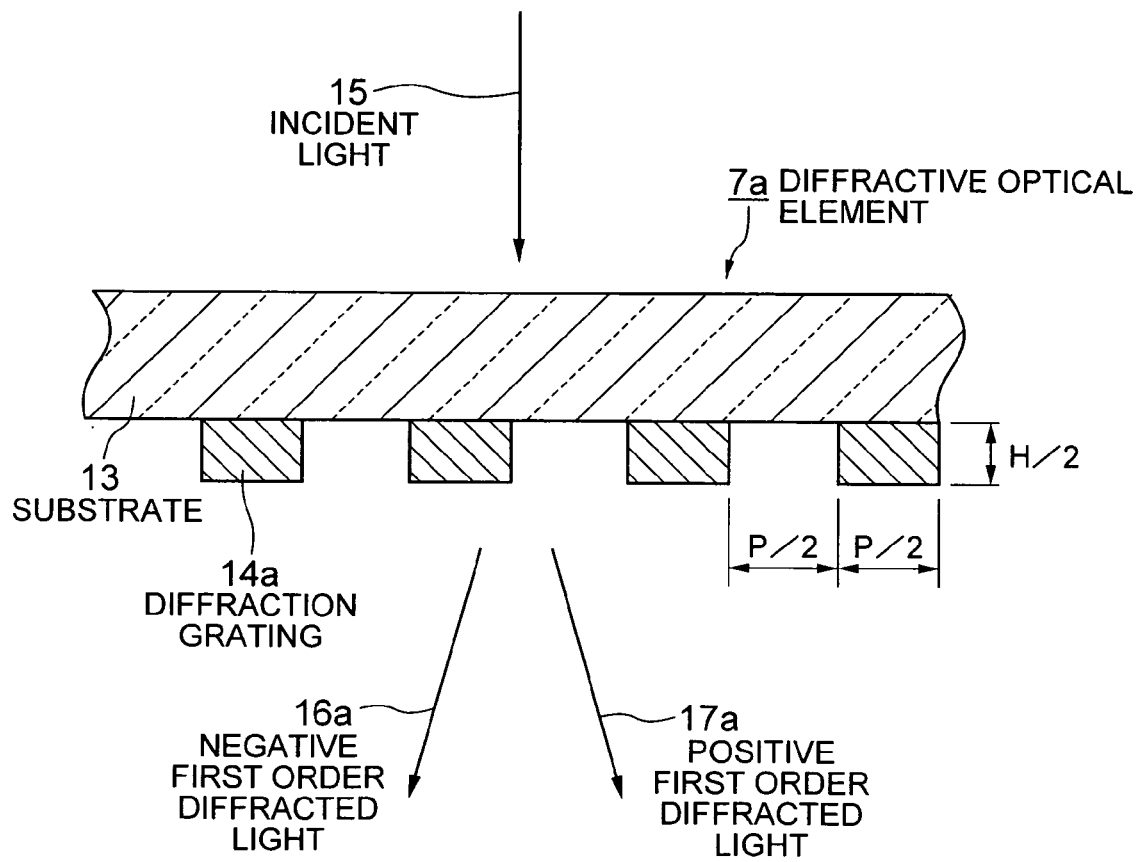
FIG. 3 A cross-sectional view of a diffractive optical element in the first exemplary embodiment of the optical head device according to the present invention.

FIG. 3 is a cross-sectional view of the diffractive optical element 7a. The diffractive optical element 7a has a diffraction grating 14a formed on a substrate 13. Reflected light from the disc 6 injects into the diffractive optical element 7a as an incident light beam 15, diffracted as negative first order diffracted light 16a and positive first order diffracted light 17a, and received by the photodetector 9a. The diffraction grating 14a has a rectangular cross-sectional shape, where a pitch of the diffraction grating 14a is represented by P, and widths of a line section and a space section are represented by P/2. Further, a height of the diffraction grating 14a is represented by H/2, and H=λ/(n−1) (λ is the wavelength of the incident light beam 15, and n is the refraction index of the diffraction grating 14a). Then, the diffraction efficiency of negative first order diffracted light and the diffraction efficiency of positive first order diffracted light are both 40.5%. That is, a light beam injects into the regions 12a, 12b, 12c, 12d of the diffractive optical element 7a is diffracted by 40.5% to be negative first order diffracted light, and is also diffracted by 40.5% to be positive first order diffracted light.

Figure 4:
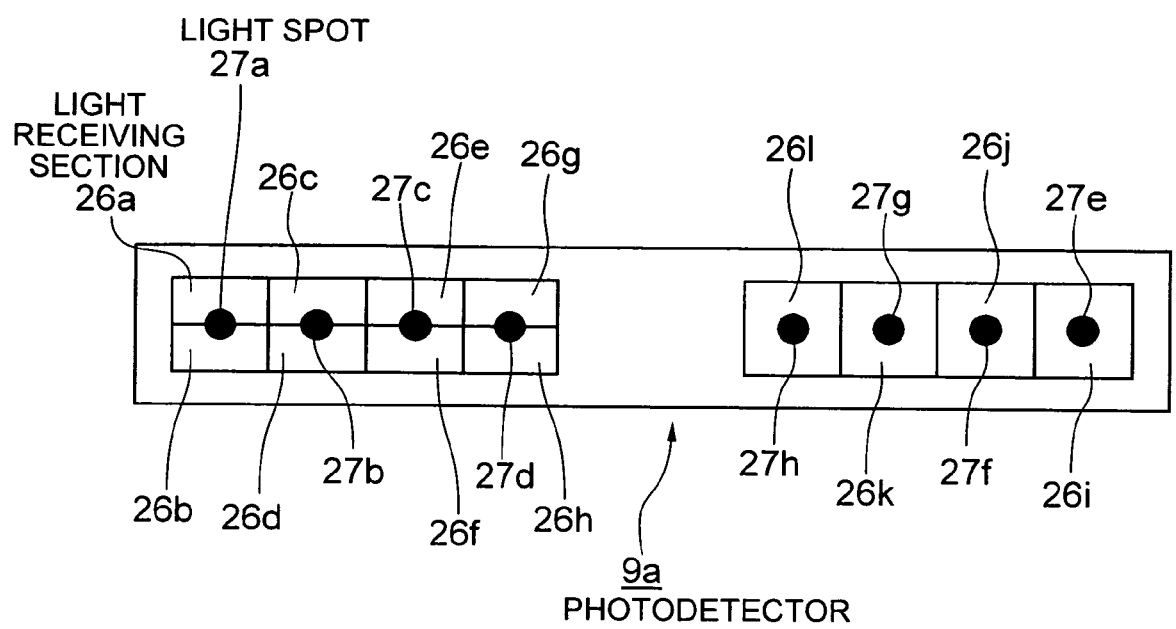
FIG. 4 A diagram showing a pattern with light receiving sections of a photodetector and an arrangement of optical spots on the photodetector in the first exemplary embodiment of the optical head device according to the present invention.

FIG. 4 shows a pattern with light receiving sections of the photodetector 9a and an arrangement of optical spots on the photodetector 9a. An optical spot 27a is corresponds to the negative first order diffracted light from the region 12a of the diffractive optical element 7a, and is received by light receiving sections 26a, 26b divided in half by a dividing line parallel to the radial direction of the disc 6. An optical spot 27b corresponds to the negative first order diffracted light from the region 12b of the diffractive optical element 7a, and is received by light receiving sections 26c, 26d divided in half by a dividing line parallel to the radial direction of the disc 6. An optical spot 27c corresponds to the negative first order diffracted light from the region 12c of the diffractive optical element 7a, and is received by light receiving sections 26e, 26f divided in half by a dividing line parallel to the radial direction of the disc 6. An optical spot 27d corresponds to the negative first order diffracted light from the region 12d of the diffractive optical element 7a, and is received by light receiving sections 26g, 26h divided in half by a dividing line parallel to the radial direction of the disc 6. An optical spot 27e corresponds to the positive first order diffracted light from the region 12a of the diffractive optical element 7a, and is received by a single light receiving section 26i. An optical spot 27f corresponds to the positive first order diffracted light from the region 12b of the diffractive optical element 7a, and is received by a single light receiving section 26j. An optical spot 27g corresponds to the positive first order diffracted light from the region 12c of the diffractive optical element 7a, and is received by a single light receiving section 26k. An optical spot 27h corresponds to the positive first order diffracted light from the region 12d of the diffractive optical element 7a, and is received by a single light receiving section 26l.

Outputs from the light receiving sections 26a to 26l are represented by V26a to V26l respectively. Then, a focus error signal by the Foucault's method can be obtained from calculation of (V26a+V26d+V26e+V26h)−(V26b+V26c+V26f+V26g). A track error signal by the phase-contrast method can be obtained from a phase difference between (V26i+V26l) and (V26j+V26k). A track error signal by the push-pull method can be obtained from calculation of (V26i+V26j)−(V26k+V26l). Further, an RF signal recorded on the disc 6 can be obtained from calculation of (V26i+V26j+V26k+V26l).

Figure 5:
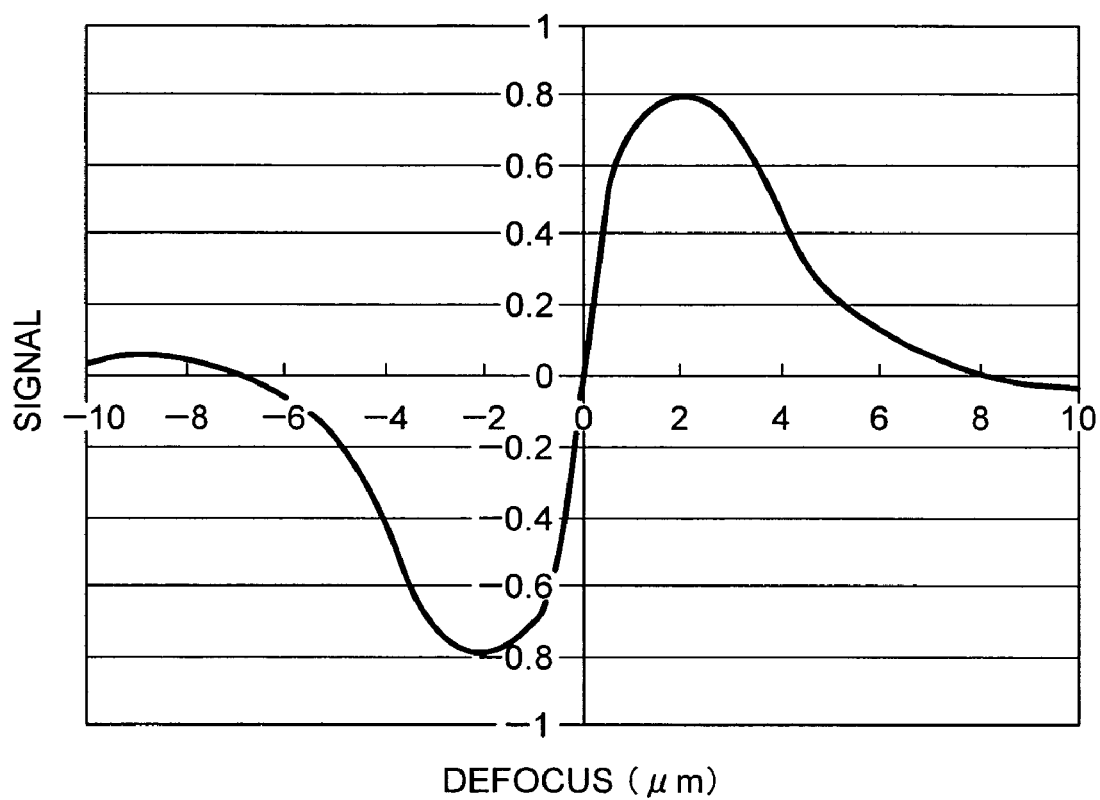
FIG. 5 A view showing a calculation example of a focus error signal detected using the first exemplary embodiment of the optical head device according to the present invention.

FIG. 5 shows a calculation example of the focus error signal detected using the first exemplary embodiment of the optical head device according to the present invention. The conditions used for the calculation are, the wavelength of the semiconductor laser 1 is 405 nm, the numerical aperture of the objective lens 5 is 0.65, the magnification of the detection optical system (ratio of focal length of the convex lens 8 and the focal length of the objective lens 5) is 10, and the size of the light receiving sections 26a to 26h of the photodetector 9a is 70 μm×35 μm. The wavelength of 405 nm and the numerical aperture of 0.65 correspond to the conditions of HD DVD. The horizontal axis of the drawing is the defocusing quantity of the disc 6 and defines a case where the disc 6 is far from the objective lens 5 as negative and a case where the disc 6 is close to the objective lens 5 as positive. The vertical axis of the drawing is the signal standardized at the level of the sum signal at the defocus of 0 μm.

The focus error signal shown in FIG. 5 contains DC component of only about +0.05 at the defocus position near −9.4 μm, and contains DC component of only about −0.05 at the defocus position near +9.4 μm. In this case, offset of only about +0.05 occurs at the just focus position of the first layer, and an offset of only about −0.05 occurs at the just focus position of the second layer in the focus error signal in the dual layer HD DVD-ROM. Thus, focus servo can be properly applied on both the first layer and the second layer, and a high quality RF signal can be obtained.

Figure 6A:
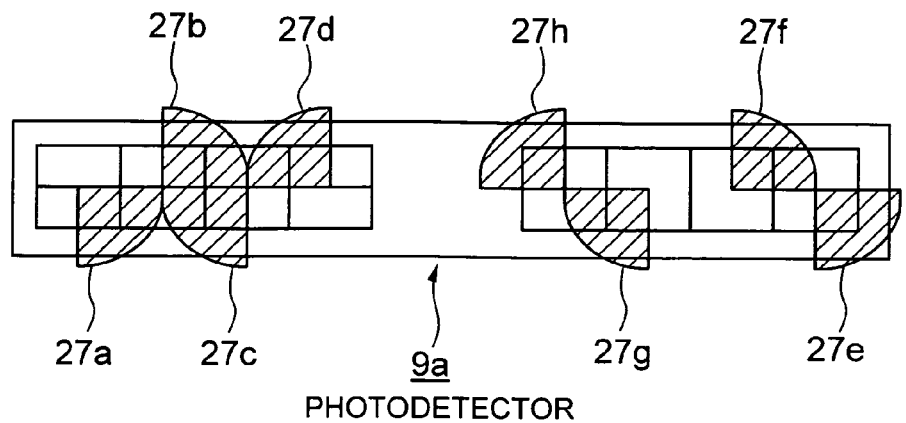
FIG. 6 A view showing change in the pattern of the light receiving sections of the photodetector and the arrangement of the optical spots on the photodetector of when a defocusing quantity of the disc is changed in the first exemplary embodiment of the optical head device according to the present invention.
Figure 6B:
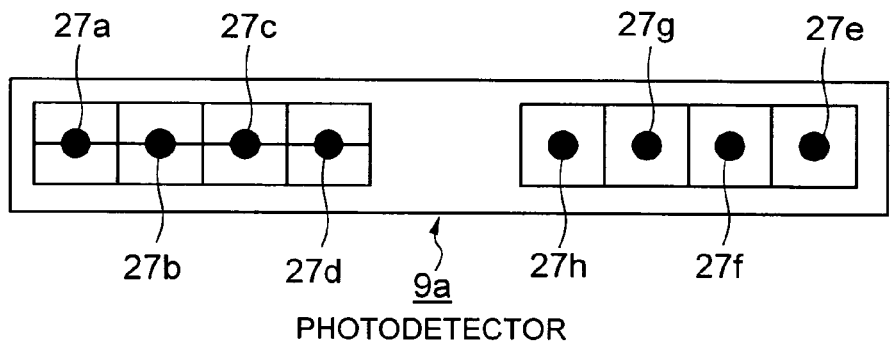
Figure 6C:
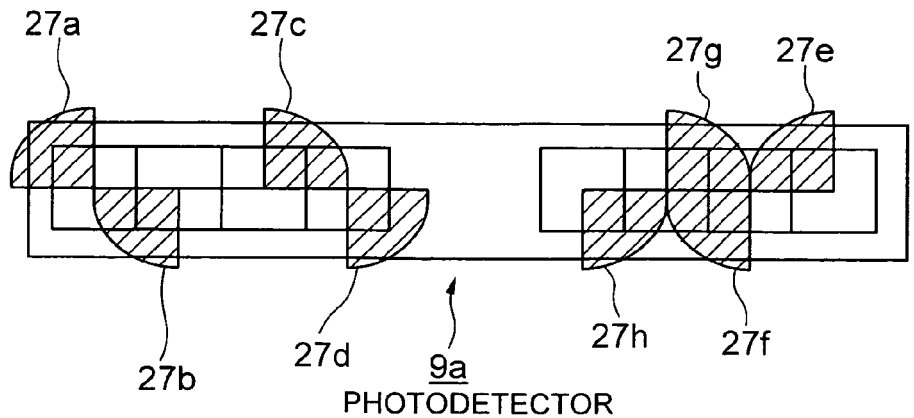

FIG. 6 shows change in the pattern of the light receiving sections of the photodetector 9a and the arrangement of the optical spots on the photodetector 9a when the defocusing quantity of the disc 6 is changed. In the drawing, (a) corresponds to a case where the disc 6 is far from the objective lens 5, (b) corresponds to a case where the disc 6 is at the just focus position, and (c) corresponds to a case where the disc 6 is close to the objective lens 5. The optical spots 27a to 27h have dot form when the disc 6 is at the just focus position, but have a quarter of a circle form when the disc 6 is far from the objective lens 5 or when close to the objective lens 5.

When the disc 6 is far from the objective lens 5, the optical spot 27a is mainly received by the light receiving section 26b, where most of the portions run over to the lower side of the light receiving section 26b and to the light receiving section 26d and only one portion remains within the light receiving section 26b when the absolute value of the defocusing quantity becomes large. The optical spot 27b is mainly received by the light receiving section 26c, where most of the portions run over to the upper side of the light receiving section 26c and to the light receiving section 26e and only one portion remains within the light receiving section 26c when the absolute value of the defocusing quantity becomes large. The optical spot 27c is mainly received by the light receiving section 26f, where most of the portions run over to the lower side of the light receiving section 26f and to the light receiving section 26d and only one portion remains within the light receiving section 26f when the absolute value of the defocusing quantity becomes large. The optical spot 27d is mainly received by the light receiving section 27g, where most of the portions run over to the upper side of the light receiving section 26g and to the light receiving section 26e and only one portion remains within the light receiving section 26g when the absolute value of the defocusing quantity becomes large. The light received by the light receiving sections 26b, 26c, 26f, 26g and the light received by the light receiving sections 26d, 26e contribute at opposite polarities to each other with respect to the focus error signal. This is because the focus error signal is obtained by (V26a+V26d+V26e+V26h)−(V26b+V26c+V26f+V26g), as described above. Therefore, if the defocusing quantity is negative, the focus error signal barely contains DC component when the absolute value of the defocusing quantity becomes large.

When the disc 6 is close to the objective lens 5, the optical spot 27a is mainly received by the light receiving section 26a, where most of the portions run over to the upper side and the left side of the light receiving section 26a and only one portion remains within the light receiving section 26a when the absolute value of the defocusing quantity becomes large. The optical spot 27b is mainly received by the light receiving section 26d, where most of the portions run over to the lower side of the light receiving section 26d and to the light receiving section 26b and only one portion remains within the light receiving section 26d when the absolute value of the defocusing quantity becomes large. The optical spot 27c is mainly received by the light receiving section 26e, where most of the portions run over to the upper side of the light receiving section 26e and to the light receiving section 26g and only one portion remains within the light receiving section 26e when the absolute value of the defocusing quantity becomes large. The optical spot 27d is mainly received by the light receiving section 27h, where most of the portions run over to the lower side and the right side of the light receiving section 26h and only one portion remains within the light receiving section 26h when the absolute value of the defocusing quantity becomes large. The light received by the light receiving sections 26a, 26d, 26e, 26h and the light received by the light receiving sections 26b, 26g contribute at opposite polarities to each other with respect to the focus error signal. Therefore, if the defocusing quantity is positive, the focus error signal barely contains DC component when the absolute value of the defocusing quantity becomes large.

Figure 7:
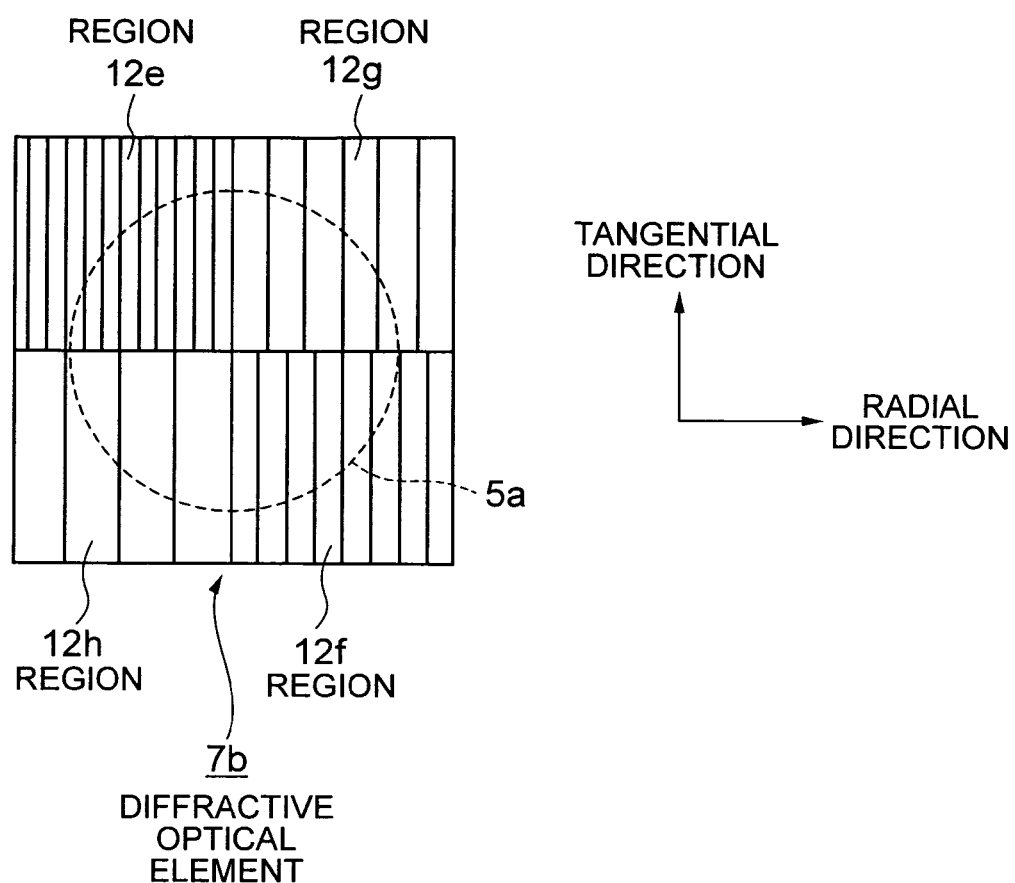
FIG. 7 A plan view of a diffractive optical element in the second exemplary embodiment of the optical head device according to the present invention.

In a second exemplary embodiment of the optical head device according to the present invention, the diffractive optical element 7a in the first exemplary embodiment is replaced with a diffractive optical element 7b. FIG. 7 is a plan view of the diffractive optical element 7b. The diffractive optical element 7b has a configuration formed with a diffraction grating divided into four regions 12e to 12h by a line passing through the optical axis of the incident light and being parallel to the radial direction of the disc 6 and a line passing through the optical axis of the incident light and being parallel to the tangential direction of the disc 6. The directions of the diffraction grating are both parallel to the tangential direction of the disc 6, and each pattern of the diffraction grating is all linear with a regular pitch. The pitch of the diffraction grating becomes wider in the order of region 12e, 12f, 12g, 12h. A circle 5a shown with a dotted line in the drawing corresponds to an effective diameter of the objective lens 5.

The cross sectional view of the diffractive optical element 7b according to the exemplary embodiment is the same as that shown in FIG. 3. A light beam injects into the regions 12e, 12f, 12g, 12h of the diffractive optical element 7b is diffracted by 40.5% to be negative first order diffracted light, and is also diffracted by 40.5% to be positive first order diffracted light.

The pattern of light receiving sections of the photodetector 9a and the arrangement of the optical spots on the photodetector 9a in the exemplary embodiment are the same as those shown in FIG. 4. The optical spots 27a, 27b, 27c, 27d correspond to the negative first order diffracted light from the regions 12e, 12f, 12g, 12h of the diffractive optical element 7b. The optical spots 27e, 27f, 27g, 27h each correspond to the positive first order diffracted light from the regions 12e, 12f, 12g, 12h of the diffractive optical element 7b.

In the exemplary embodiment, a focus error signal by the Foucault's method, a track error signal by the phase-contrast method, a track error signal by the push-pull method, and an RF signal recorded on the disc 6 can be obtained with the same method described in the first exemplary embodiment with reference to FIG. 4.

The calculation example of the focus error signal detected using the exemplary embodiment is substantially the same as that shown in FIG. 5, and the DC component is barely contained at the defocus position near −9.4 µm and the defocus position near +9.4 µm. In this case, offset barely occurs at the just focus position of the first layer and at the just focus position of the second layer in the focus error signal in the dual layer HD DVD-ROM. Thus, focus servo can be properly applied on both the first layer and the second layer, and a high quality RF signal can be obtained.

In the exemplary embodiment, according to the principle similar to the principle described with reference to FIG. 6 in the first exemplary embodiment, the focus error signal barely contains DC component when the absolute value of the defocusing quantity becomes large for both cases of when the defocusing quantity is negative and when the defocusing quantity is positive.

A third exemplary embodiment of the optical head device according to the present invention has a configuration in which the diffractive optical element 7a in the first exemplary embodiment is replaced with a diffractive optical element 7c. The plan view of the diffractive optical element 7c is the same as that shown in FIG. 2.

Figure 8:
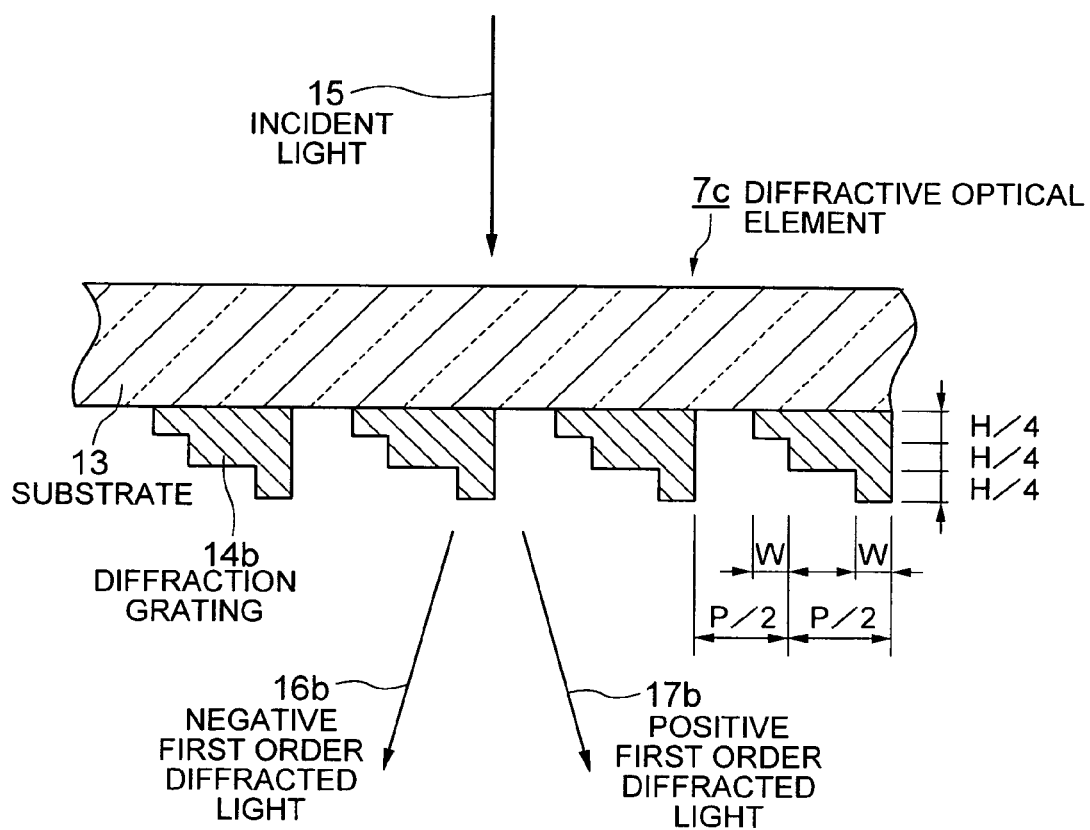
FIG. 8 A cross-sectional view of a diffractive optical element in the third exemplary embodiment of the optical head device according to the present invention.

FIG. 8 is a cross-sectional view of the diffractive optical element 7c. The diffractive optical element 7c has a diffraction grating 14b formed on a substrate 13. Reflected light from the disc 6 injects into the diffractive optical element 7c as an incident light beam 15, and is diffracted to be a negative first order diffracted light 16b and a positive first order diffracted light 17b so as to be received by the photodetector 9a. The diffraction grating 14b has a cross-section in a staircase-shaped with four levels, where a pitch of the diffraction grating 14b is represented by P, and a widths of a first to a fourth levels are represented by P/2−W, W, P/2−W, W respectively (note that W/P=0.135). In addition, heights of the first to the fourth levels of the diffraction grating 14b are 0, H/4, H/2, 3H/4, and H=λ/(n−1) (λ is a wavelength of the incident light beam 15, n is a refraction index of the diffraction grating 14b). Then, a diffraction efficiency of negative first order diffracted light is 10%, and the diffraction efficiency of positive first order diffracted light is 71%. That is, each light beam injects into the regions 12a, 12b, 12c, and 12d in the diffractive optical element 7c is diffracted to be negative first order diffracted light by 10%, and is diffracted to be positive first order diffracted light by 71%. A ratio between the diffraction efficiencies of negative first order diffracted light and positive first order diffracted light can be changed by variations of W/P values.

The pattern of the light receiving sections of the photodetector 9a and the arrangement of the optical spots on the photodetector 9a according to the exemplary embodiment are the same as those shown in FIG. 4.

In the exemplary embodiment, a focus error signal by the Foucault's method, a track error signal by the phase-contrast method, a track error signal by the push-pull method, and an RF signal recorded on the disc 6 can be obtained with the same method described in the first exemplary embodiment with reference to FIG. 4. In the exemplary embodiment, high signal to noise ratio is obtained for the RF signal since the volume of light used for the detection of the track error signal and the RF signal is larger than the volume of light used for the detection of the focus error signal.

The calculation example of the focus error signal detected using the exemplary embodiment is the same as that shown in FIG. 5, and the DC component is barely contained at the defocus position near −9.4 μm and the defocus position near +9.4 μm. In this case, the offset barely occurs at the just focus position of the first layer and the just focus position of the second layer in the focus error signal of the dual layer HD DVD-ROM. Thus, focus servo can be properly applied on both the first layer and the second layer, and a high quality RF signal can be obtained.

In the exemplary embodiment, according to the principle similar to the principle described with reference to FIG. 6 in the first exemplary embodiment, the focus error signal barely contains DC component when the absolute value of the defocusing quantity becomes large for both cases of when the defocusing quantity is negative and when the defocusing quantity is positive.

A mode in which the diffractive optical element 7a according to the first exemplary embodiment is replaced with a diffractive optical element 7d (not shown) having a plan view same as that shown in FIG. 7 and a cross sectional view same as that shown in FIG. 8 is also considered for the exemplary embodiment of the optical head device according to the exemplary embodiment.

Figure 9:
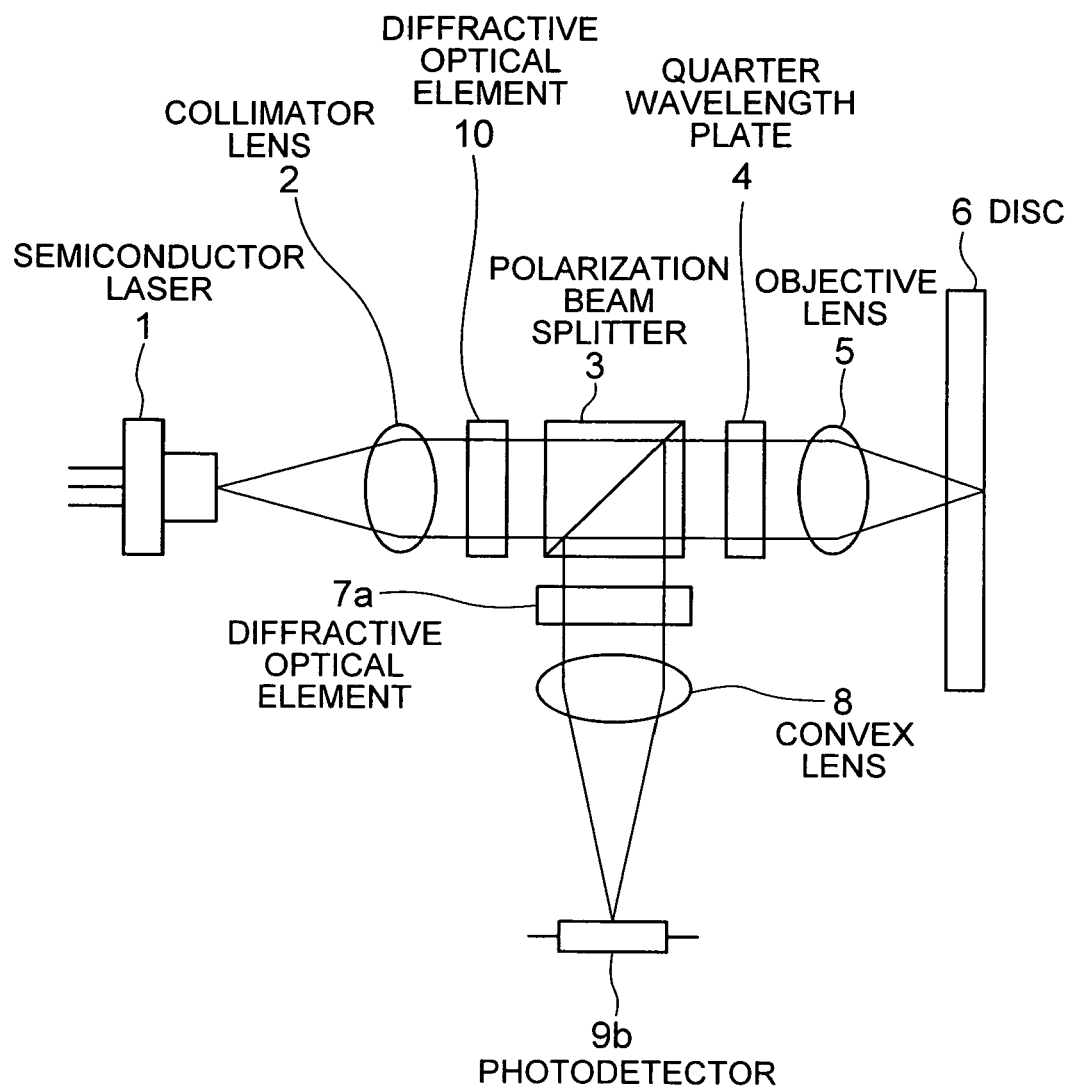
FIG. 9 A diagram showing a fourth exemplary embodiment of an optical head device according to the present invention.

FIG. 9 shows a fourth exemplary embodiment of an optical head device according to the present invention. In the exemplary embodiment, a diffractive optical element 10 is inserted in between the collimator lens 2 and the polarization beam splitter 3 of the first exemplary embodiment, in addition, a photodetector 9b is placed instead of the photodetector 9a. Emitting light from the semiconductor laser 1 is parallelized by the collimator lens 2, and is split into three light beams, a main beam of zeroth order light and two sub beams of positive/negative first order diffracted lights, by the diffractive optical element 10. These light beams inject into the polarization beam splitter 3 as P polarization to be transmitted by almost 100%, and are transmitted through the quarter wavelength plate 4 to be converted from linear polarization to circular polarization, and then are collected on the disc 6 by the objective lens 5. Three reflected light beams from the disc 6 are transmitted through the objective lens 5 inversely, and are transmitted through the quarter wavelength plate 4 to be converted from the circular polarization into linear polarization with a polarization direction orthogonal to the one of incoming way, and then they inject into the polarization beam splitter 3 as S polarization to be reflected by almost 100%, diffracted by the diffractive optical element 7a, and received by the photodetector 9b after transmitted through the convex lens 8.

The plan view of the diffractive optical element 7a in the exemplary embodiment is the same as that shown in FIG. 2. The cross sectional view of the diffractive optical element 7a in the exemplary embodiment is the same as that shown in FIG. 3.

Figure 10:
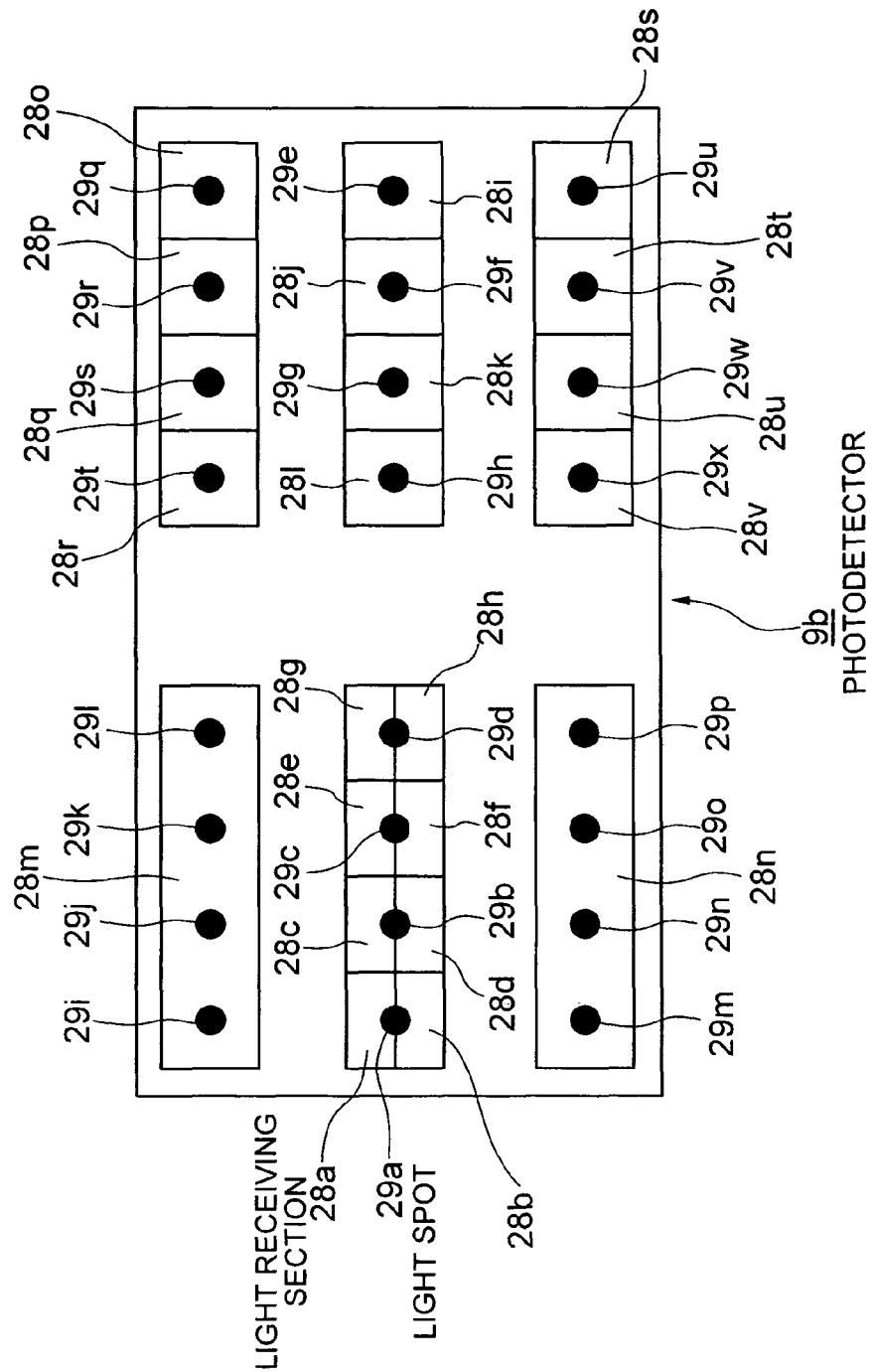
FIG. 10 A diagram showing a pattern with light receiving sections of a photodetector and an arrangement of optical spots on the photodetector in the fourth exemplary embodiment of the optical head device according to the present invention.

FIG. 10 shows a pattern with light receiving sections in the photodetector 9b and an arrangement of optical spots on the photodetector 9b. Optical spot 29a corresponds to negative first order diffracted light from the region 12a of the diffractive optical element 7a depending on zeroth order light from the diffractive optical element 10, and is received by light receiving sections 28a and 28b into which a light receiving section is divided by a dividing line parallel to a radial direction of the disc 6. Optical spot 29b corresponds to negative first order diffracted light from region 12b of the diffractive optical element 7a depending on zeroth order light from the diffractive optical element 10, and is received by light receiving sections 28c and 28d into which a light receiving section is divided by a dividing line parallel to the radial direction of the disc 6. An optical spot 29c corresponds to negative first order diffracted light from the region 12c of the diffractive optical element 7a depending on zeroth order light from the diffractive optical element 10, and is received by light receiving sections 28e and 28f into which a light receiving section is divided by a dividing line parallel to the radial direction of the disc 6. An optical spot 29d corresponds to negative first order diffracted light from the region 12d of the diffractive optical element 7a depending on zeroth order light from the diffractive optical element 10, and is received by light receiving sections 28g and 28h into which a light receiving section is divided by a dividing line parallel to the radial direction of the disc 6. An optical spot 29e corresponds to positive first order diffracted light from the region 12a of the diffractive optical element 7a depending on zeroth order light from the diffractive optical element 10, and is received by a single light receiving section 28i. An optical spot 29f corresponds to positive first order diffracted light from the region 12b of the diffractive optical element 7a depending on zeroth order light from the diffractive optical element 10, and is received by a single light receiving section 28j. An optical spot 29g corresponds to positive first order diffracted light from the region 12c of the diffractive optical element 7a depending on zeroth order light from the diffractive optical element 10, and is received by a single light receiving section 28k. An optical spot 29h corresponds to positive first order diffracted light from the region 12d of the diffractive optical element 7a depending on zeroth order light from the diffractive optical element 10, and is received by a single light receiving section 28l.

The optical spots 29i, 29j, 29k, 29l correspond to the negative first order diffracted light from the regions 12a, 12b, 12c, 12d of the diffractive optical element 7a depending on the negative first order diffracted light from the diffractive optical element 10, and are received by a single light receiving section 28m. The optical spots 29m, 29n, 29o, 29p correspond to the negative first order diffracted light from the regions 12a, 12b, 12c, 12d of the diffractive optical element 7a depending on the positive first order diffracted light from the diffractive optical element 10, and are received by a single light receiving section 28n. The optical spots 29q, 29r, 29s, 29t correspond to the positive first order diffracted light from the regions 12a, 12b, 12c, 12d of the diffractive optical element 7a depending on the negative first order diffracted light from the diffractive optical element 10, and are respectively received by single light receiving sections 28o, 28p, 28q, 28r. The optical spots 29u, 29v, 29w, 29x correspond to the positive first order diffracted light from the regions 12a, 12b, 12c, 12d of the diffractive optical element 7a depending on the positive first order diffracted light from the diffractive optical element 10, and are respectively received by single light receiving sections 28s, 28t, 28u, 28v.

Here, outputs from the light receiving sections 28a to 28v are represented by V28a-V28v respectively. Then, a focus error signal by the Foucault's method can be obtained from calculation of (V28a+V28d+V28e+V28h)−(V28b+V28c+V28f+V28g). A track error signal by the phase-contrast method can be obtained from a phase difference between (V28i+V28l) and (V28j+V28k). A track error signal by the push-pull method can be obtained from calculation of {(V28i+V28j)−(V28k+V28l)}−K{(V28o+V28p+V28s+V28t)−(V28q+V28r+V28u+V28v)} (K is a constant number). Further, an RF signal recorded on the disc 6 can be obtained from calculation of (V28i+V28j+V28k+V28l). In the exemplary embodiment, a differential push-pull method is used in which a track error signal by the push-pull method is a difference between push-pull signals of the main beam and the sub beams, therefore offset does not occur in a track error signal even if the objective lens 5 shifts in the radial direction of the disc 6.

The calculation example of the focus error signal detected using the exemplary embodiment is substantially the same as that shown in FIG. 5, and the DC component is barely contained at the defocus position near −9.4 μm and the defocus position near +9.4 μm. In this case, offset barely occurs at the just focus position of the first layer and at the just focus position of the second layer in the focus error signal in the dual layer HD DVD-ROM. Thus, focus servo can be properly applied on both the first layer and the second layer, and a high quality RF signal can be obtained.

In the exemplary embodiment, according to the principle similar to the principle described with reference to FIG. 6 in the first exemplary embodiment, the focus error signal barely contains DC component when the absolute value of the defocusing quantity becomes large for both cases of when the defocusing quantity is negative and when the defocusing quantity is positive.

A mode in which the diffractive optical element 7a according to the fourth exemplary embodiment is replaced with the diffractive optical elements 7b, 7c, 7d is also considered as another exemplary embodiment of the optical head device according to the exemplary embodiment.

Figure 11:
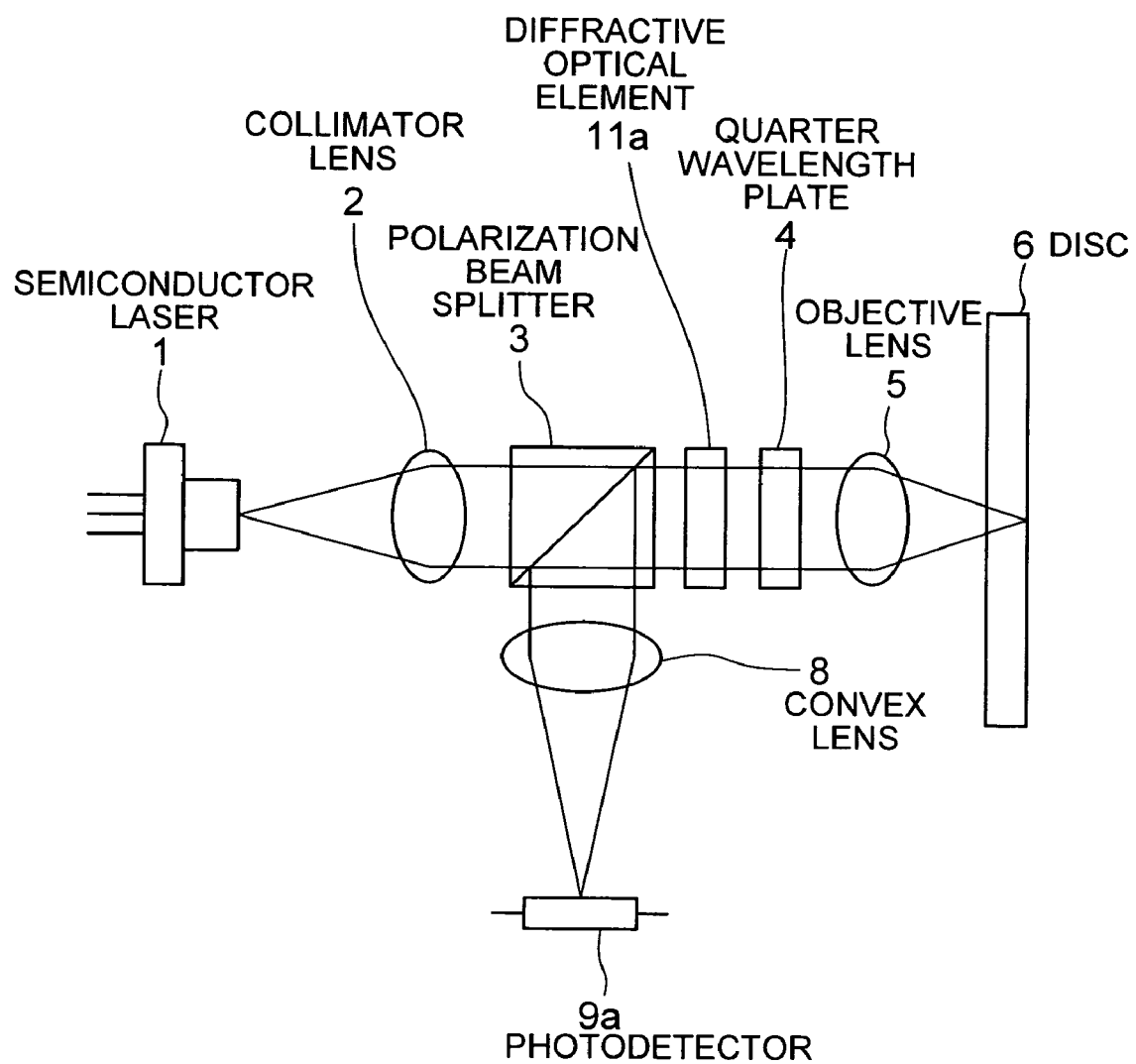
FIG. 11 A diagram showing a fifth exemplary embodiment of an optical head device according to the present invention.

FIG. 11 shows a fifth exemplary embodiment of an optical head device according to the present invention. According to the exemplary embodiment, the diffractive optical element 7a provided in between the polarization beam splitter 3 and the convex lens 8 in the first exemplary embodiment is replaced by diffractive optical element 11a provided in between the polarization beam splitter 3 and the quarter wavelength plate 4. Emitting light from the semiconductor laser 1 is parallelized by the collimator lens 2, and injects into the polarization beam splitter 3 as P polarization to be transmitted by almost 100%, and then is transmitted through the diffractive optical element 11a, and is also transmitted through the quarter wavelength plate 4 to be converted from linear polarization into circular polarization, and then is collected on the disc 6 by the objective lens 5. Reflected light from the disc 6 is transmitted through the objective lends 5 inversely, and is transmitted through the quarter wavelength plate 4 to be converted from the circular polarization into linear polarization with a polarization direction orthogonal to the one in the incoming way, is diffracted by the diffractive optical element 11a, injects into the polarization beam splitter 3 as S polarization to be reflected by almost 100%, and then are received by the photodetector 9a after transmitted through the convex lens 8.

Figure 12:
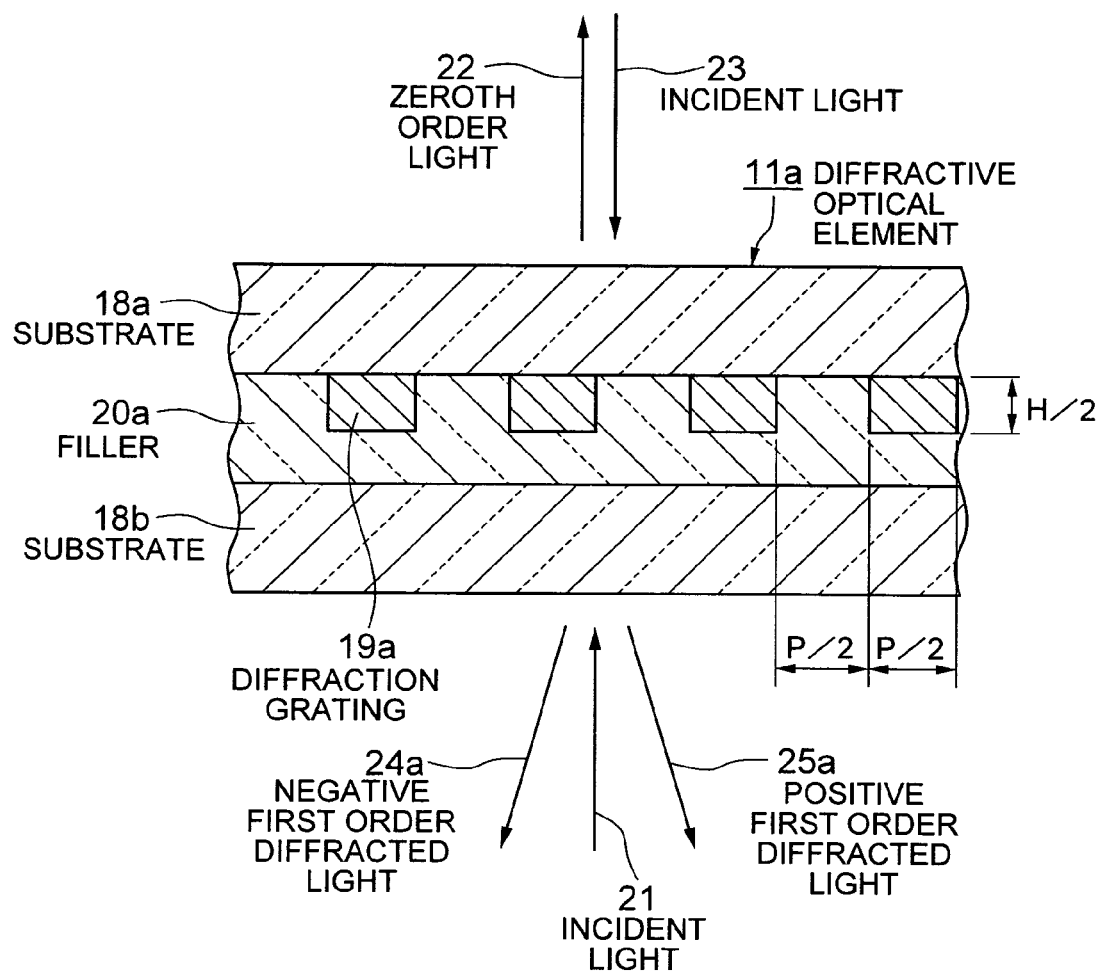
FIG. 12 A cross-sectional view of a diffractive optical element in the fifth exemplary embodiment of the optical head device according to the present invention.

FIG. 12 shows a cross-sectional view of the diffractive optical element 11a. The diffractive optical element 11a includes a diffraction grating 19a with birefringence formed on a substrate 18a, filler 20a is filled therein, and a substrate 18b is put thereon. Crystal or liquid crystal polymer may be used for the diffraction grating 19a. The diffractive optical element 11a has functions of transmitting a polarization component with a specific direction out of incident light beams, and diffracting a polarization component with a direction orthogonal to the specific direction. Emitting light from the semiconductor laser 1 injects into the diffractive optical element 11a as an incident light beam 21. This light beam has a polarization direction corresponding to the specific direction, so that it is transmitted to be a zeroth order light beam 22 and directed towards the disc 6. Meanwhile, the reflected light from the disc 6 injects into the diffractive optical element 11a as an incident light beam 23. This light beam has a polarization direction corresponding to a direction orthogonal to the specific direction, so that it is diffracted to be negative first order diffracted light beam 24a and positive first order diffracted light beam 25a, and received by the photodetector 9a.

The diffraction grating 19a has a rectangular cross-sectional shape, where a pitch of the diffraction grating 19a is represented by P, widths of a line section and a space section are represented by P/2. In addition, a height of the diffraction grating 19a is represented by H/2, and $H=\lambda/(n_D-n_F)$ (note that λ is a wavelength of the incident light beams 21 and 23, $n_D$ is a refraction index of the diffraction grating 19a with respect to the polarization direction of the incident light beam 23, and $n_F$ is a refraction index of the filler 20a). In this regard, the refraction index of the diffraction grating 19a with respect to the polarization direction of the incident light beam 21 is $n_F$. Then, a transmissivity of zeroth order light is 100% with respect to the incident light beam 21. Further, a diffraction efficiency of negative first order diffracted light and a diffraction efficiency of positive first order diffracted light are both 40.5% with respect to the incident light beam 23. That is, each light beam injects into the regions 12a, 12b, 12c and 12d of the diffractive optical element 11a is transmitted to be zeroth order light by 100% in the incoming way. Also, each light beam injects into the regions 12a, 12b, 12c and 12d of the diffractive optical element 11a is diffracted to be negative first order diffracted light by 40.5% and diffracted to be positive first order diffracted light by 40.5% in the outgoing way.

A pattern with light receiving sections in the photodetector 9a and an arrangement of optical spots on the photodetector 9a according to the exemplary embodiment is same as the one shown in FIG. 4.

In the exemplary embodiment, a focus error signal by the Foucault's method, a track error signal by the phase-constant method, a track error signal by the push-pull method, and an RF signal recorded on the disc 6 can be obtained by the same method described in the first exemplary embodiment with reference to FIG. 4. In the exemplary embodiment, an offset seldom occurs in a track error signal even if the objective lens 5 shifts toward the radial direction of the disc 6, when the diffractive optical elements 11a and the quarter wavelength plate 4 are driven together with the objective lens 5 on an unillustrated actuator.

The calculation example of the focus error signal detected using the exemplary embodiment is the same as that shown in FIG. 5, and the DC component is barely contained at the defocus position near −9.4 μm and the defocus position near +9.4 μm. In this case, offset barely occurs at the just focus position of the first layer and at the just focus position of the second layer in the focus error signal in the dual layer HD DVD-ROM. Thus, focus servo can be properly applied on both the first layer and the second layer, and a high quality RF signal can be obtained.

In the exemplary embodiment, according to the principle similar to the principle described with reference to FIG. 6 in the first exemplary embodiment, the focus error signal barely contains DC component when the absolute value of the defocusing quantity becomes large for both cases of when the defocusing quantity is negative and when the defocusing quantity is positive.

Another exemplary embodiment of the optical head device according to the present invention includes a mode in which the diffractive optical element 11a according to the fifth exemplary embodiment is replaced with a diffractive optical element 11b (not shown), the plan view of which is the same as that of FIG. 7 and the cross sectional view is the same as that of FIG. 12.

A sixth exemplary embodiment of the optical head device according to the present invention has a configuration in which the diffractive optical element 11a according to the fifth exemplary embodiment is replaced with the diffractive optical element 11c. The plan view of the diffractive optical element 11c is the same as that shown in FIG. 2.

Figure 13:
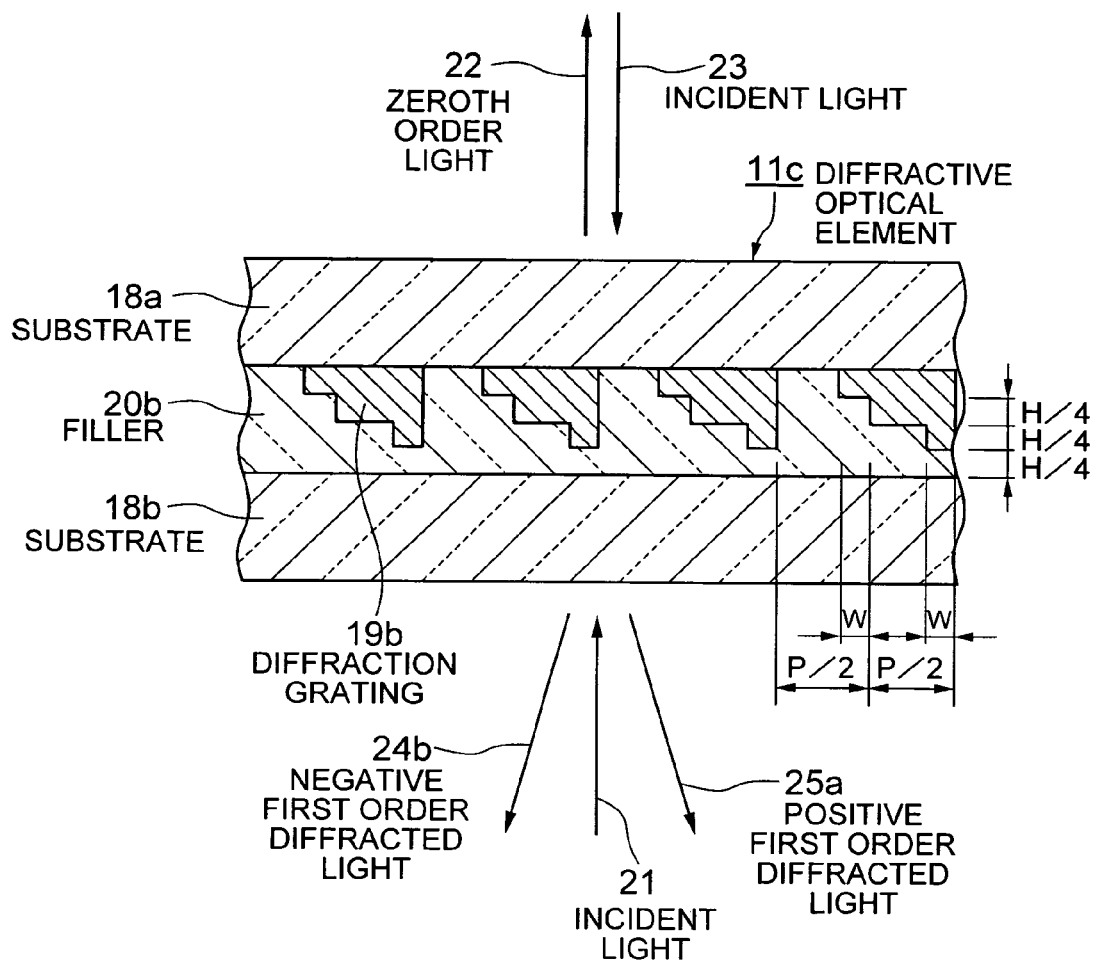
FIG. 13 A cross-sectional view of a diffractive optical element in a sixth exemplary embodiment of the optical head device according to the present invention.

FIG. 13 shows a cross-sectional view of the diffractive optical element 11c. The diffractive optical element 11c includes a diffraction grating 19b with birefringence formed on a substrate 18a, filler 20b is filled therein, and a substrate 18b is put thereon. Crystal or liquid crystal polymer may be used for the diffraction grating 19b. The diffractive optical element 11c has functions of transmitting a polarization component with a specific direction out of incident light beams, and diffracting a polarization component with a direction orthogonal to the specific direction. Emitting light from the semiconductor laser 1 injects into the diffractive optical element 11c as an incident light beam 21. This light beam has a polarization direction corresponding to the specific direction, so that it is transmitted to be a zeroth order light beam 22 and directed towards the disc 6. Meanwhile, the reflected light from the disc 6 injects into the diffractive optical element 11c as an incident light beam 23. This light beam has a polarization direction corresponding to a direction orthogonal to the specific direction, so that it is diffracted to be negative first order diffracted light 24b and positive first order diffracted light 25b, and received by the photodetector 9a.

The diffraction grating 19b has a cross-section in a staircase-shaped with four levels, where a pitch of the diffraction grating 19b is represented by P, and a widths of a first to a fourth levels are represented by P/2−W, W, P/2−W, W respectively (note that W/P=0.135). In addition, heights of the first to the fourth levels of the diffraction grating 19b are 0, H/4, H/2, 3H/4, and H=$\lambda/(n_D-n_F)$ (note that $\lambda$ is a wavelength of the incident light beams 21 and 23, $n_D$, is a refraction index of the diffraction grating 19b with respect to the polarization direction of the incident light beam 23, and $n_F$ is a refraction index of the filler 20b). In this regard, the refraction index of the diffraction grating 19b with respect to the polarization direction of the incident light beam 21 is $n_F$. Then, a transmissivity of zeroth order light is 100% with respect to the incident light beam 21. Further, a diffraction efficiency of the negative first order diffracted light is 10% and a diffraction efficiency of the positive first order diffracted light is 71% with respect to the incident light beam 23. That is, each light beam injects into the regions 12a, 12b, 12c and 12d of the diffractive optical element 11c is transmitted to be zeroth order light by 100% in the incoming way. Also, each light beam injects into the regions 12a, 12b, 12c and 12d of the diffractive optical element 11c is diffracted to be negative first order diffracted light by 10% and diffracted to be positive first order diffracted light by 71% in the outgoing way. A ratio between the diffraction efficiencies of negative first order diffracted light and positive first order diffracted light can be changed by variations of W/P values.

A pattern with light receiving sections in the photodetector 9a and an arrangement of optical spots on the photodetector 9a according to the exemplary embodiment is same as the one shown in FIG. 4.

In the exemplary embodiment, a focus error signal by the Foucault's method, a track error signal by the phase-contrast method, a track error signal by the push-pull method, and an RF signal recorded on the disc 6 can be obtained with the same method described in the first exemplary embodiment with reference to FIG. 4. In the exemplary embodiment, high signal to noise ratio is obtained for the RF signal since the volume of light used for the detection of the track error signal and the RF signal is larger than the volume of light used for the detection of the focus error signal. In the exemplary embodiment, an offset seldom occurs in a track error signal even if the objective lens 5 shifts toward the radial direction of the disc 6, when the diffractive optical elements 11c and the quarter wavelength plate 4 are driven together with the objective lens 5 on an unillustrated actuator.

The calculation example of the focus error signal detected using the exemplary embodiment is the same as that shown in FIG. 5, and the DC component is barely contained at the defocus position near −9.4 μm and the defocus position near +9.4 μm. In this case, offset barely occurs at the just focus position of the first layer and at the just focus position of the second layer in the focus error signal in the dual layer HD DVD-ROM. Thus, focus servo can be properly applied on both the first layer and the second layer, and a high quality RF signal can be obtained.

In the exemplary embodiment, according to the principle similar to the principle described with reference to FIG. 6 in the first exemplary embodiment, the focus error signal barely contains DC component when the absolute value of the defocusing quantity becomes large for both cases of when the defocusing quantity is negative and when the defocusing quantity is positive.

Another exemplary embodiment of the optical head device according to the present invention includes a mode in which the diffractive optical element 11a according to the fifth exemplary embodiment is replaced with a diffractive optical element 11b (not shown), the plan view of which is the same as that of FIG. 7 and the cross sectional view is the same as that of FIG. 13.

Figure 14:
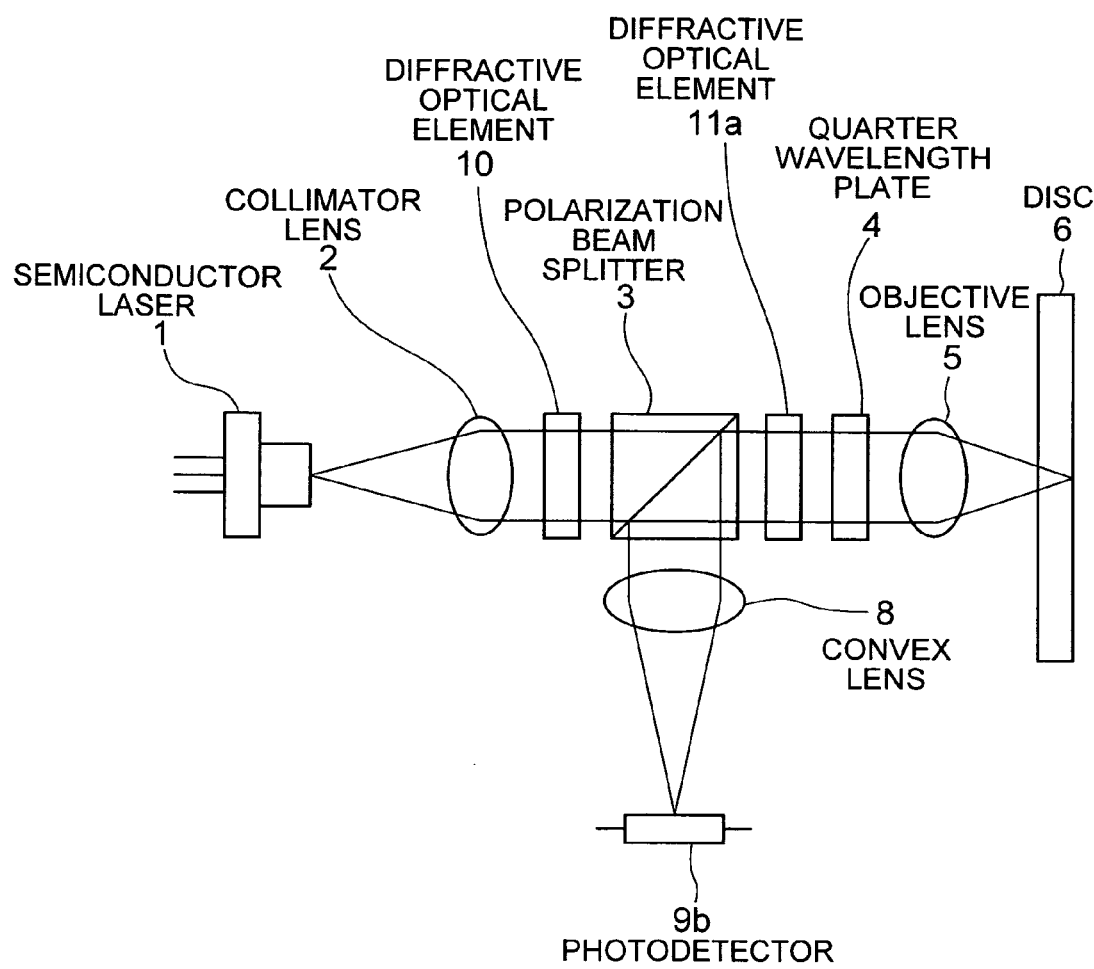
FIG. 14 A diagram showing a seventh exemplary embodiment of an optical head device according to the present invention.

FIG. 14 shows a seventh exemplary embodiment of an optical head device according to the present invention. In the exemplary embodiment, a diffractive optical element 10 is inserted in between the collimator lens 2 and the polarization beam splitter 3 of the fifth exemplary embodiment, in addition, a photodetector 9b is placed instead of the photodetector 9a. Emitting light from the semiconductor laser 1 is parallelized by the collimator lens 2, and is split into three light beams, a main beam of zeroth order light and two sub beams of positive/negative first order diffracted lights, by the diffractive optical element 10. These light beams inject into the polarization beam splitter 3 as P polarization to be transmitted by almost 100%, transmitted through the diffractive optical element 11a, and are transmitted through the quarter wavelength plate 4 to be converted from linear polarization to circular polarization, and then are collected on the disc 6 by the objective lens 5. Three reflected light beams from the disc 6 are transmitted through the objective lens 5 inversely, and are transmitted through the quarter wavelength plate 4 to be converted from the circular polarization into linear polarization with a polarization direction orthogonal to the one of incoming way, diffracted by the diffractive optical element 11a, and then they inject into the polarization beam splitter 3 as S polarization to be reflected by almost 100%, and received by the photodetector 9b after transmitted through the convex lens 8.

The plan view of the diffractive optical element 11a in the exemplary embodiment is the same as the one shown in FIG. 2. The cross sectional view of the diffractive optical element 11a in the exemplary embodiment is the same as the one shown in FIG. 12. A pattern with light receiving sections in the photodetector 9b and an arrangement of optical spots on the photodetector 9b according to the exemplary embodiment is same as the one shown in FIG. 10.

In the exemplary embodiment, a focus error signal by the Foucault's method, a track error signal by the phase-contrast method, a track error signal by the push-pull method, and an RF signal recorded on the disc 6 can be obtained with the same method described in the fourth exemplary embodiment with reference to FIG. 10. In the exemplary embodiment, an offset seldom occurs in a track error signal even if the objective lens 5 shifts toward the radial direction of the disc 6, when the diffractive optical elements 11a and the quarter wavelength plate 4 are driven together with the objective lens 5 on an unillustrated actuator. Further, in the exemplary embodiment, a differential push-pull method is used in which a track error signal by the push-pull method is a difference between push-pull signals of the main beam and the sub beams, therefore offset does not occur in a track error signal even if the objective lens 5 shifts in the radial direction of the disc 6.

The calculation example of the focus error signal detected using the exemplary embodiment is the same as that shown in FIG. 5, and the DC component is barely contained at the defocus position near −9.4 μm and the defocus position near +9.4 μm. In this case, offset barely occurs at the just focus position of the first layer and at the just focus position of the second layer in the focus error signal in the dual layer HD DVD-ROM. Thus, focus servo can be properly applied on both the first layer and the second layer, and a high quality RF signal can be obtained.

In the exemplary embodiment, according to the principle similar to the principle described with reference to FIG. 6 in the first exemplary embodiment, the focus error signal barely contains DC component when the absolute value of the defocusing quantity becomes large for both cases of when the defocusing quantity is negative and when the defocusing quantity is positive.

Another exemplary embodiment of the optical head device according to the present invention includes a mode in which the diffractive optical element 11a according to the seventh exemplary embodiment is replaced with diffractive optical elements 11b, 11c, 11d.

Figure 15:
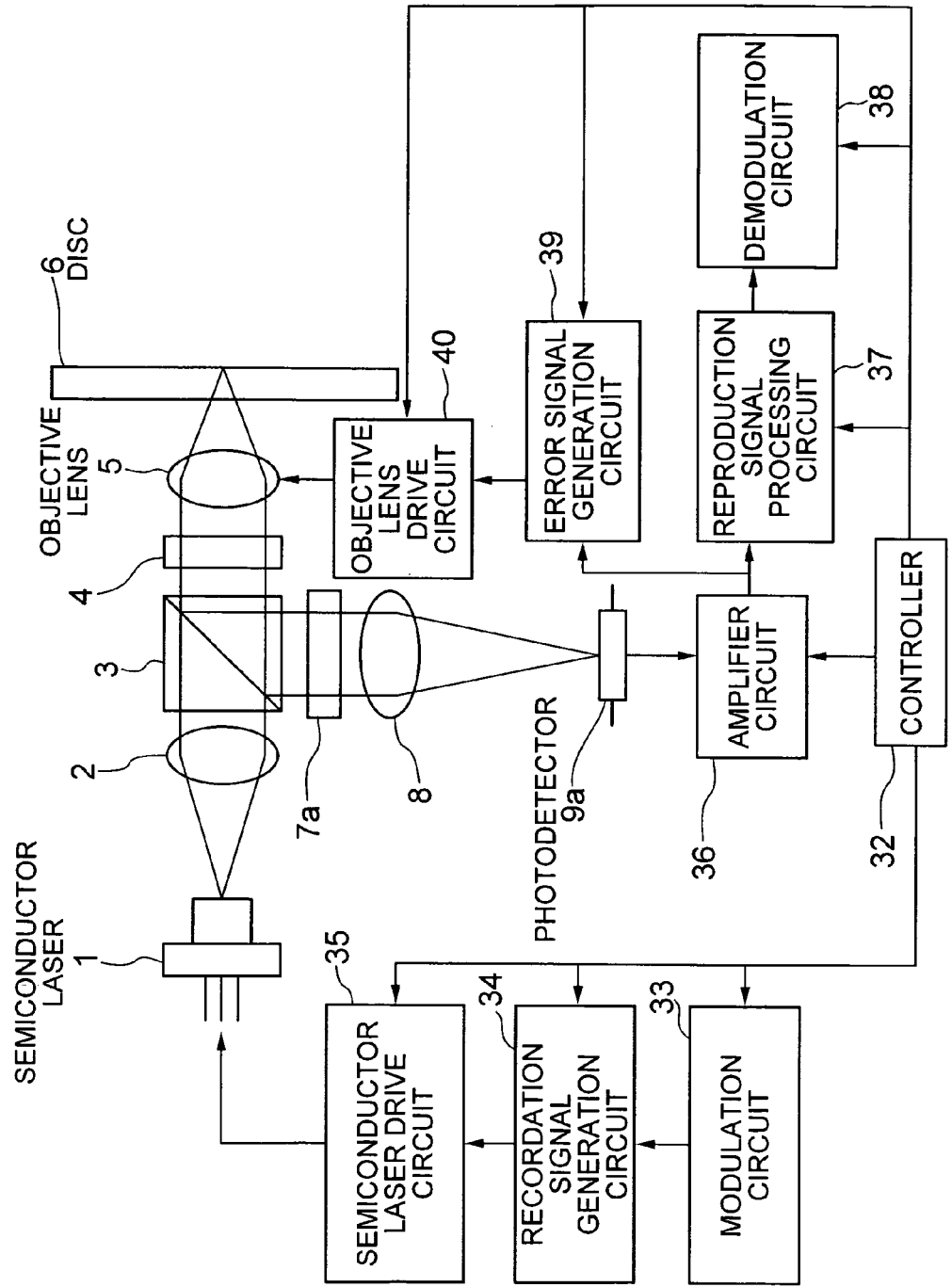
FIG. 15 A diagram showing an exemplary embodiment of an optical information recording/reproducing device according to the present invention.

FIG. 15 shows a first exemplary embodiment of an optical information recording/reproducing device according to the present invention. The exemplary embodiment includes a controller 32, a modulation circuit 33, a record signal generation circuit 34, a semiconductor laser drive circuit 35, an amplifier circuit 36, a reproduction signal processing circuit 37, a demodulation circuit 38, an error signal generation circuit 39, and an objective lens drive circuit 40 which are added to the optical head device of the first exemplary embodiment according to the present invention.

The modulation circuit 33 modulates data to be recorded on the disc 6 in accordance with a modulation regulation. The record signal generation circuit 34 generates a record signal to drive the semiconductor laser 1 in accordance with a write strategy based on a signal modulated by the modulation circuit 33. The semiconductor laser drive circuit 35 drives the semiconductor laser 1 providing electric current thereto depending on the record signal for the semiconductor laser 1 based on the record signal generated by the record signal generation circuit 34. Accordingly, the data is recorded on the disc 6.

The amplifier circuit 33 amplifies output from each light receiving section of the photodetector 9a. The reproduction signal processing circuit 37 performs generation, waveform equalization, and binarization for an RF signal based on a signal amplified by the amplifier circuit 36. The demodulation circuit 38 demodulates the signal binarized by the reproduction signal processing circuit 37 in accordance with a demodulation regulation. Accordingly, the data from the disc 6 is reproduced.

The error signal generation circuit 39 generates a focus error signal and a track error signal based on the signal amplified by the amplifier circuit 36. The objective lens drive circuit 40 drives the objective lens 5 providing electric current depending on the error signal to an unillustrated actuator for driving the objective lens 5, based on the error signal generated by the error signal generation circuit 39.

Further, optical systems except the disc 6 are driven toward the radial direction of the disc 6 by an unillustrated positioner, and the disc 6 is driven to rotate by an unillustrated spindle. Accordingly, servos are controlled with respect to focusing, tracking, a positioner, and a spindle.

Circuits relating to data recording such as from the modulation circuit 33 to the semiconductor laser drive circuit 35, circuits relating to data reproduction such as from the amplifier circuit 36 to the demodulation circuit 38, and circuits relating to servos such as from the amplifier circuit 36 to the objective lens drive circuit 40 are controlled by the controller 32.

The exemplary embodiment is an information recording/reproducing device to perform recording and reproduction for the disc 6. On the other hand, another exemplary embodiment of an optical information recording/reproducing device according to the present invention may be a reproducing device to perform only reproduction for the disc 6. In this case, the semiconductor laser 1 is not driven in accordance with a record signal, but is driven to maintain emitting light power in a certain value by the semiconductor laser drive circuit 35.

Another exemplary embodiment of an optical information recording/reproducing device according to the present invention may include a controller, a modulation circuit, a record signal generation circuit, a semiconductor laser drive circuit, an amplifier circuit, a reproduction signal processing circuit, a demodulation circuit, an error signal generation circuit, an objective lens drive circuit which are added to the second to the seventh exemplary embodiments of the optical head device according to the present invention.

DESCRIPTION OF SYMBOLS 1 semiconductor laser
2 collimator lens
3 polarization beam splitter
4 quarter wavelength plate
5 objective lens
6 disc (optical recording medium)
7a to 7e diffractive optical element
8 convex lens
9a to 9c photodetector
10 diffractive optical element
11a to 11d diffractive optical element
12a to 12l region (diffracting regions)
13 substrate
14a, 14b diffraction grating
15 incident light beam
16a, 16b negative first order diffracted light
17a, 17b positive first order diffracted light
18a, 18b substrate
19a, 19b diffraction grating
20a, 20b filler
21 incident light beam
22 zeroth order light
23 incident light beam
24a, 24b negative first order diffracted light
25a, 25b positive first order diffracted light
26a to 26h light receiving section (dual-divided light receiving section, positive component light receiving section, negative component light receiving section)
26i to 26l light receiving section 27*a* to 27*h* optical spot
28*a* to 28*h* light receiving section (dual-divided light receiving section, positive component light receiving section, negative component light receiving section)
28*i* to 29*v* light receiving section
29*a* to 29*x* optical spot
30*a* to 30*h* light receiving section
31*a* to 31*h* optical spot
32 controller
33 modulation circuit
34 record signal generation circuit
35 semiconductor laser drive circuit
36 amplifier circuit
37 reproduction signal processing circuit
38 demodulation circuit
39 error signal generation circuit
40 objective lens drive circuit

The invention claimed is:

1. An optical head device comprising a light source; an objective lens for collecting emitting light from the light source on a disc shaped optical recording medium; a diffractive optical element, arranged on an optical path of a reflection light from the optical recording medium, for generating a diffracted light from the reflected light; and a photodetector for receiving the diffracted light generated by the diffractive optical element, wherein the optical recording medium includes an optical recording medium with at least a signal layer of first layer and second layer;

the photodetector includes a plurality of positive component light receiving sections for receiving the diffracted light and outputting as a positive component of a focus error signal, and a plurality of negative component light receiving sections for receiving the diffracted light and outputting as a negative component of the focus error signal; and when the signal layer of the optical recording medium is far from the objective lens or close to the objective lens by a defocusing quantity corresponding to an interval between the first layer and the second layer from a just focus position, the diffraction direction of the diffracted light is set and the plurality of positive component light receiving sections and the plurality of negative component light receiving sections are arranged so that the diffracted light generated from the reflected light of the signal layer spreads to the positive component light receiving section and the negative component light receiving section, wherein the diffractive optical element is divided into four diffracting regions in a plane vertical to an optical axis of the reflection light by a first line passing through the optical axis and corresponding to a radial direction of the optical recording medium and a second line passing through the optical axis and corresponding to a tangential direction of the optical recording medium;

the four diffracting regions each generate the diffracted light of a specific order from the reflection light;

the photodetector includes four dual-divided light receiving sections divided into two of the positive component light receiving section and the negative component light receiving section by a third line parallel to the first line; and when the two diffracting regions positioned on one side with the first line among the four diffracting regions are set as first and second diffracting regions, the two diffracting regions positioned on the other side are set as third and fourth diffracting regions, and the four dual-divided light receiving sections are set as first to fourth dual-divided light receiving sections, the four dual-divided light receiving sections are arranged in an order of the first dual-divided light receiving section, the third dual-divided light receiving section, the second dual-divided light receiving section, and the fourth dual-divided light receiving section along the third line, wherein a linear diffraction grating is formed in the four diffracting regions each, the direction of the grating being parallel to the second line and the pitch of the grating being equal; and the pitch of the diffraction grating becomes wider or narrower in the order of the first diffracting region, the third diffracting region, the second diffracting region, and the fourth diffracting region.

2. The optical head device according to claim 1, wherein the diffractive optical element further generates a diffracted light of another order different from the specific order from the reflected light in the four diffracting regions; and the photodetector further includes four light receiving sections for receiving the diffracted light of the other order to detect a track error signal and a RF signal.

3. An optical information recording/reproducing device comprising:

the optical head device according to claim 2;

a circuit for generating the focus error signal based on the output signals from the four dual-divided light receiving sections; and a circuit for generating the track error signal and the RF signal based on the output signals from the four light receiving sections.

4. An optical information recording/reproducing device comprising:

the optical head device according to claim 1; and a circuit for generating the focus error signal based on the output signals from the four dual-divided light receiving sections.

* * * * *